(12) United States Patent
Cavallaro et al.

(10) Patent No.: US 11,397,264 B2
(45) Date of Patent: *Jul. 26, 2022

(54) TRACKING SYSTEM

(71) Applicant: SportsMEDIA Technology Corporation, Durham, NC (US)

(72) Inventors: Richard H. Cavallaro, Mountain View, CA (US); James Orville McGuffin, Saratoga, CA (US); John Roy Borton, Los Gatos, CA (US)

(73) Assignee: SPORTSMEDIA TECHNOLOGY CORPORATION, Durham, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/332,456

(22) Filed: May 27, 2021

(65) Prior Publication Data

US 2021/0286077 A1 Sep. 16, 2021

Related U.S. Application Data

(63) Continuation of application No. 16/838,588, filed on Apr. 2, 2020, now Pat. No. 11,022,690, which is a (Continued)

(51) Int. Cl.
*G01S 17/14* (2020.01)
*G01S 5/16* (2006.01)
(Continued)

(52) U.S. Cl.
CPC .......... *G01S 17/14* (2020.01); *A63B 24/0021* (2013.01); *G01J 5/0022* (2013.01);
(Continued)

(58) Field of Classification Search
CPC ... A63F 9/22; H04Q 7/00; H04N 7/18; H04N 9/47; G01S 13/867; G01S 17/42;
(Continued)

(56) References Cited

U.S. PATENT DOCUMENTS 632,496 A 9/1899 Kitson
3,840,699 A 10/1974 Bowerman
(Continued)

FOREIGN PATENT DOCUMENTS

BE 1014999 8/2004
CA 2106336 A1 3/1994
(Continued)

OTHER PUBLICATIONS

"Optotrak Smart Markers—Freedom from Wires!," Northern Digital Inc., 2008, http://www.ndigital.com/lifesciences/smartmarkers.php, printed Jan. 19, 2010. cited by applicant.
(Continued)

*Primary Examiner* — Nam V Nguyen
(74) *Attorney, Agent, or Firm* — NEO IP

(57) ABSTRACT

A system simultaneously tracks multiple objects. All or a subset of the objects includes a wireless receiver and a transmitter for providing an output. The system includes one or more wireless transmitters that send commands to the wireless receivers of the multiple objects instructing different subsets of the multiple objects to output (via their respective transmitter) at different times. The system also includes object sensors that receive output from the transmitters of the multiple objects and a computer system in communication with the object sensors. The computer system calculates locations of the multiple objects based on the sensed output from the multiple objects.

20 Claims, 14 Drawing Sheets

Related U.S. Application Data continuation of application No. 16/362,225, filed on Mar. 22, 2019, now Pat. No. 10,613,226, which is a continuation of application No. 15/489,333, filed on Apr. 17, 2017, now Pat. No. 10,241,205, which is a continuation of application No. 14/506,969, filed on Oct. 6, 2014, now Pat. No. 9,625,321, which is a continuation of application No. 12/906,012, filed on Oct. 15, 2010, now Pat. No. 8,884,741.

(60) Provisional application No. 61/307,578, filed on Feb. 24, 2010.

(51) Int. Cl.
| | |
|---|---|
| *G01S 17/74* | (2006.01) |
| *H04Q 5/22* | (2006.01) |
| *G01S 17/18* | (2020.01) |
| *G01J 5/0804* | (2022.01) |
| *A63B 24/00* | (2006.01) |
| *G01J 5/00* | (2022.01) |
| *G01S 13/86* | (2006.01) |
| *G01S 17/42* | (2006.01) |
| *G01S 17/48* | (2006.01) |
| *G01S 17/58* | (2006.01) |
| *A63B 71/06* | (2006.01) |
| *A63B 102/24* | (2015.01) |

(52) U.S. Cl.
CPC ............ *G01J 5/0804* (2022.01); *G01S 5/16* (2013.01); *G01S 13/865* (2013.01); *G01S 13/867* (2013.01); *G01S 17/18* (2020.01); *G01S 17/42* (2013.01); *G01S 17/48* (2013.01); *G01S 17/58* (2013.01); *G01S 17/74* (2013.01); *H04Q 5/22* (2013.01); *A63B 2024/004* (2013.01); *A63B 2024/0025* (2013.01); *A63B 2024/0028* (2013.01); *A63B 2071/0638* (2013.01); *A63B 2102/24* (2015.10); *A63B 2220/13* (2013.01); *A63B 2220/20* (2013.01); *A63B 2220/40* (2013.01); *A63B 2220/806* (2013.01); *A63B 2220/836* (2013.01); *A63B 2225/54* (2013.01); *A63B 2243/0025* (2013.01); *A63B 2243/0066* (2013.01); *G01J 2005/0077* (2013.01)

(58) Field of Classification Search
CPC . G01S 17/48; G01S 17/58; G01S 5/16; G01S 17/74; G01J 5/0022; G01J 5/0834; G01J 2005/0077; A63B 24/0021; A63B 2024/004; A63B 2102/24; A63B 2024/0025; A63B 2024/0028; A63B 2071/0638; A63B 2220/13; A63B 2220/20; A63B 2220/40; A63B 2220/806; A63B 2220/836; A63B 2225/54; A63B 2243/0025; A63B 2243/0066
USPC ........................................ 340/8.1, 10.1–10.5
See application file for complete search history.

(56) References Cited

U.S. PATENT DOCUMENTS

| | | | |
|---|---|---|---|
| 4,084,184 A | 4/1978 | Crain | |
| 4,420,770 A | 12/1983 | Rahman | |
| 4,591,897 A | 5/1986 | Edelson | |
| 5,063,603 A | 11/1991 | Burt | |
| 5,187,540 A * | 2/1993 | Morrison | F41G 3/225 356/139.03 |
| 5,264,833 A | 11/1993 | Jeffers et al. | |
| 5,346,210 A | 9/1994 | Dike et al. | |
| 5,353,392 A | 10/1994 | Luquet et al. | |
| 5,436,672 A | 7/1995 | Medioni et al. | |
| 5,488,675 A | 1/1996 | Hanna | |
| 5,491,517 A | 2/1996 | Kreitman et al. | |
| 5,523,783 A | 6/1996 | Cho | |
| 5,564,698 A | 10/1996 | Honey et al. | |
| 5,566,251 A | 10/1996 | Hanna et al. | |
| 5,627,915 A | 5/1997 | Rosser et al. | |
| 5,686,902 A | 11/1997 | Reis et al. | |
| 5,808,695 A | 9/1998 | Rosser et al. | |
| 5,862,517 A | 1/1999 | Honey et al. | |
| 5,882,204 A | 3/1999 | Iannazo et al. | |
| 5,892,554 A | 4/1999 | DiCicco et al. | |
| 5,903,317 A | 5/1999 | Sharir et al. | |
| 5,912,700 A | 6/1999 | Honey et al. | |
| 5,917,553 A | 6/1999 | Honey et al. | |
| 5,923,365 A | 7/1999 | Tamir et al. | |
| 5,953,077 A | 9/1999 | Honey et al. | |
| 6,042,492 A | 3/2000 | Baum | |
| 6,100,925 A | 8/2000 | Rosser et al. | |
| 6,133,946 A | 10/2000 | Cavallaro et al. | |
| 6,201,579 B1 | 3/2001 | Tamir et al. | |
| 6,208,386 B1 | 3/2001 | Wilf et al. | |
| 6,252,632 B1 | 6/2001 | Cavallaro | |
| 6,266,100 B1 | 7/2001 | Gloudemans et al. | |
| 6,270,433 B1 | 8/2001 | Orenstein et al. | |
| 6,297,853 B1 | 10/2001 | Sharir et al. | |
| 6,308,565 B1 | 10/2001 | French et al. | |
| 6,324,296 B1 | 11/2001 | McSheery et al. | |
| 6,380,933 B1 | 4/2002 | Sharir et al. | |
| 6,438,508 B2 | 8/2002 | Tamir et al. | |
| 6,559,884 B1 | 5/2003 | Tamir et al. | |
| 6,567,038 B1 | 5/2003 | Granot et al. | |
| 6,710,713 B1 | 3/2004 | Russo | |
| 6,744,403 B2 | 6/2004 | Milnes et al. | |
| 6,782,118 B2 | 8/2004 | Verga | |
| 6,950,123 B2 | 9/2005 | Martins | |
| 6,965,397 B1 | 11/2005 | Honey et al. | |
| 7,015,817 B2 | 3/2006 | Copley et al. | |
| 7,137,712 B2 | 11/2006 | Brunner et al. | |
| 7,139,582 B2 | 11/2006 | Couronné et al. | |
| 7,204,796 B1 | 4/2007 | Seiler | |
| 7,286,043 B2 * | 10/2007 | Carrender | G06K 7/0008 340/10.42 |
| 7,292,867 B2 | 11/2007 | Werner et al. | |
| 7,327,383 B2 | 2/2008 | Valleriano et al. | |
| 7,341,530 B2 | 3/2008 | Cavallaro et al. | |
| 7,450,024 B2 | 11/2008 | Wildman et al. | |
| 7,526,389 B2 | 4/2009 | Greenwald et al. | |
| 7,544,137 B2 | 6/2009 | Richardson | |
| 7,864,168 B2 | 1/2011 | French | |
| 7,911,320 B2 | 3/2011 | Ehrman et al. | |
| 8,172,722 B2 | 5/2012 | Molyneux et al. | |
| 8,231,506 B2 | 7/2012 | Molyneux et al. | |
| 8,289,185 B2 | 10/2012 | Alonso | |
| 8,477,995 B2 | 7/2013 | Porter et al. | |
| 8,786,415 B2 | 7/2014 | Cavallaro et al. | |
| 8,786,596 B2 | 7/2014 | House | |
| 8,884,741 B2 | 11/2014 | Cavallaro et al. | |
| 9,625,321 B2 | 4/2017 | Cavallaro et al. | |
| 9,656,143 B2 | 5/2017 | Thurman et al. | |
| 2003/0095186 A1 | 5/2003 | Aman et al. | |
| 2004/0123600 A1 | 7/2004 | Brunell et al. | |
| 2007/0002039 A1 | 1/2007 | Pendleton et al. | |
| 2007/0080804 A1 | 4/2007 | Hirahara et al. | |
| 2007/0135243 A1 | 6/2007 | LaRue et al. | |
| 2007/0183041 A1 | 8/2007 | McCloy et al. | |
| 2007/0275787 A1 | 11/2007 | Bouchard et al. | |
| 2008/0013826 A1 * | 1/2008 | Hillis | G06F 3/0425 382/154 |
| 2008/0140233 A1 | 6/2008 | Seacat | |
| 2008/0318595 A1 | 12/2008 | Rofougaran | |
| 2010/0026809 A1 | 2/2010 | Curry | |
| 2010/0277285 A1 | 11/2010 | Anderson et al. | |
| 2010/0283630 A1 | 11/2010 | Alonso | |
| 2011/0205022 A1 | 8/2011 | Cavallaro et al. | |
| 2011/0205077 A1 | 8/2011 | Cavallaro et al. | |
| 2011/0269517 A1 | 11/2011 | Englert et al. | |
| 2012/0126973 A1 | 5/2012 | DeAngelis et al. | |

(56) References Cited

U.S. PATENT DOCUMENTS

| | | |
|---|---|---|
| 2017/0219707 A1 | 8/2017 | Cavallaro et al. |
| 2019/0219694 A1 | 7/2019 | Cavallaro et al. |
| 2020/0233084 A1 | 7/2020 | Cavallaro et al. |

FOREIGN PATENT DOCUMENTS

| | | |
|---|---|---|
| DE | 4101156 A1 | 7/1992 |
| EP | 1708375 A1 | 10/2006 |
| WO | 9510915 A1 | 4/1995 |
| WO | 9510919 A1 | 4/1995 |
| WO | 03079672 A1 | 9/2003 |

OTHER PUBLICATIONS

"RFID Football Helmet: Play it safe," RFID weblog, http://www.rfid-weblog.com/50226711/rfid.sub.—football.sub.- --helmet.sub.--play.sub.-it.sub.-safe.php, printed Jan. 19, 2010. cited by applicant.

Collins, "Smart Soccer Ball Misses Its Goal," RFID Journal, http://www.rfidjournal.com/article/view/2029/1/1, Dec. 5, 2005. cited by applicant.

Raskar, "Prakash: Lighting Aware Motion Capture using Photosensing Markers and Multiplexed illuminators," ACM Transactions on Graphics, vol. 26, No. 3, Article 36, Jul. 2007. cited by applicant.

\* cited by examiner

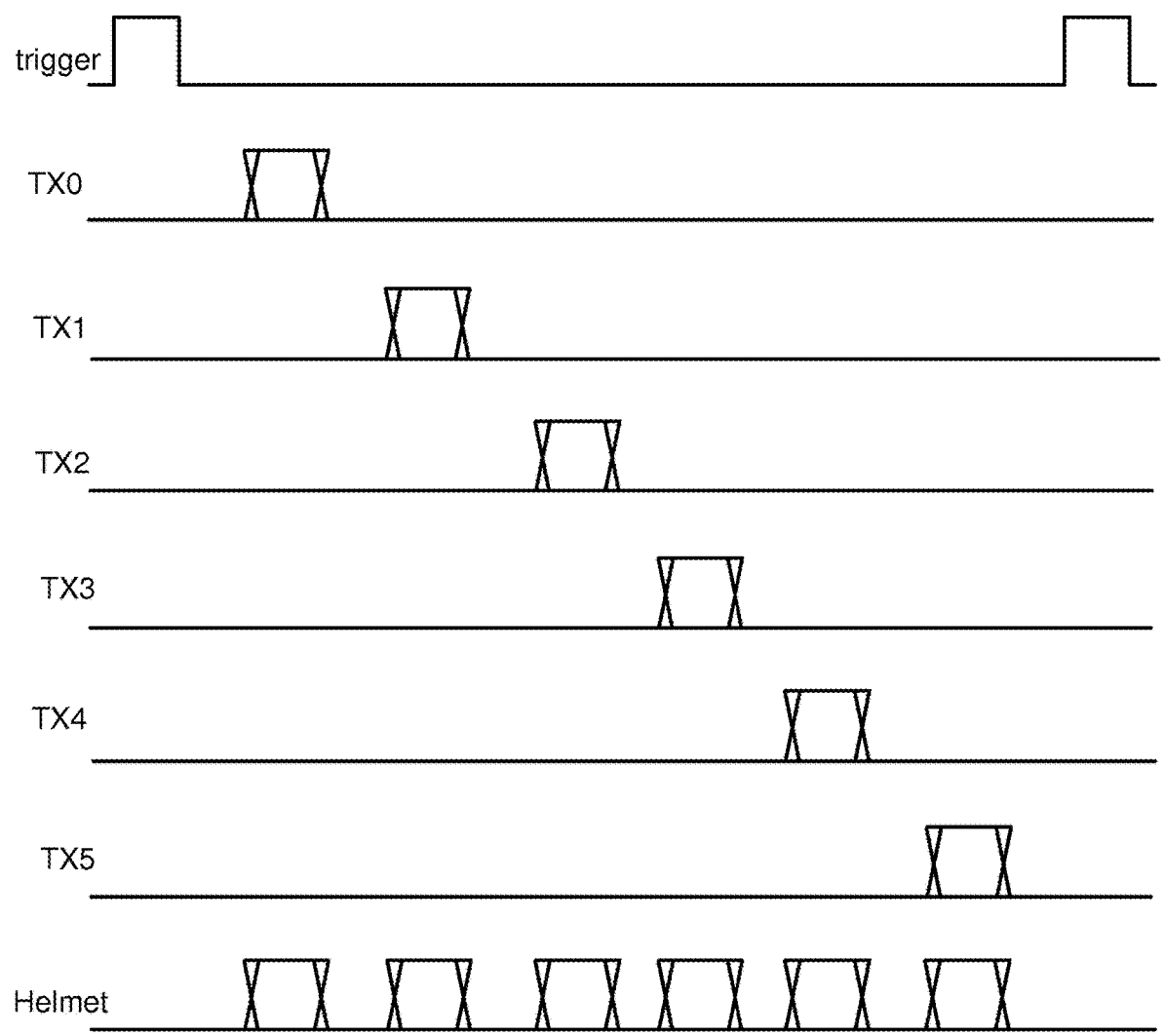

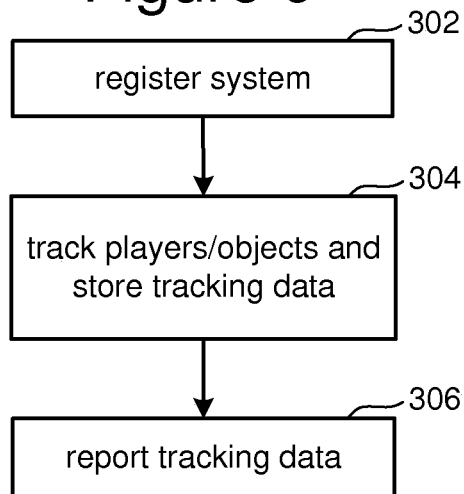
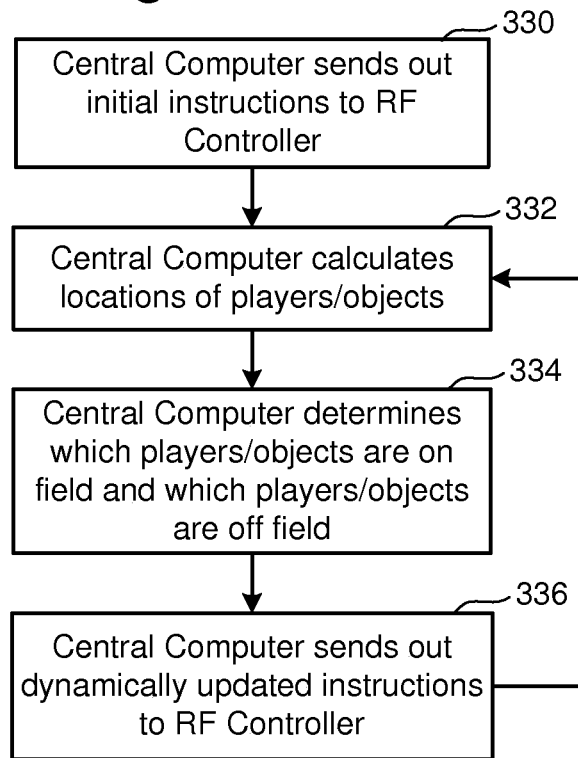
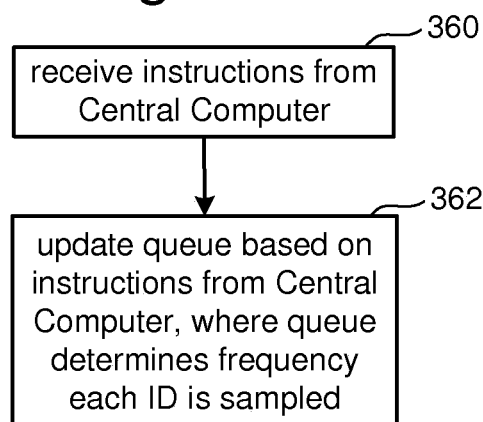
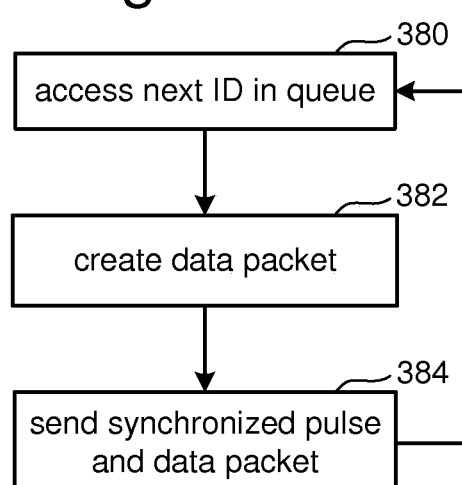

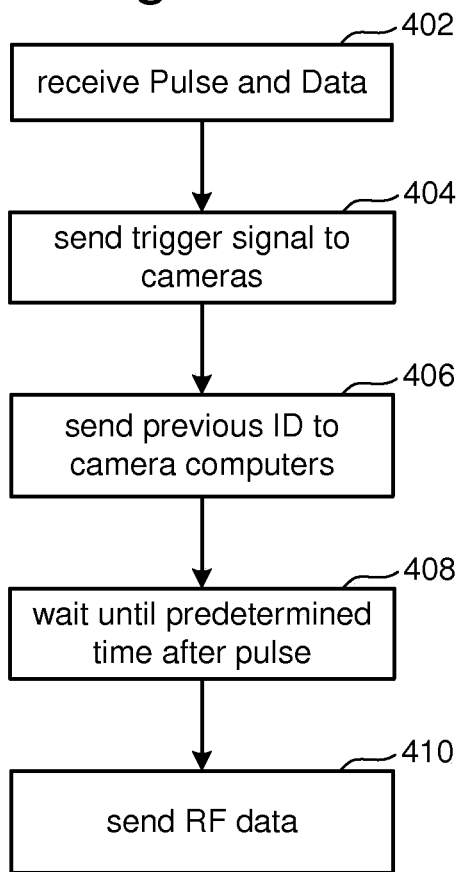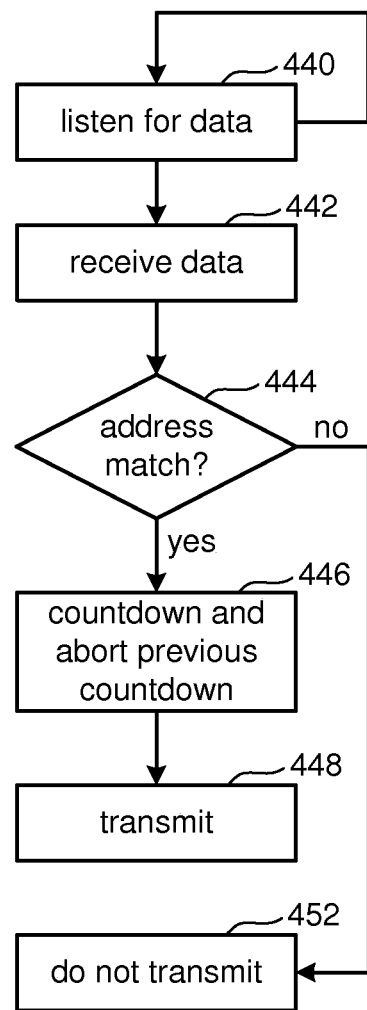

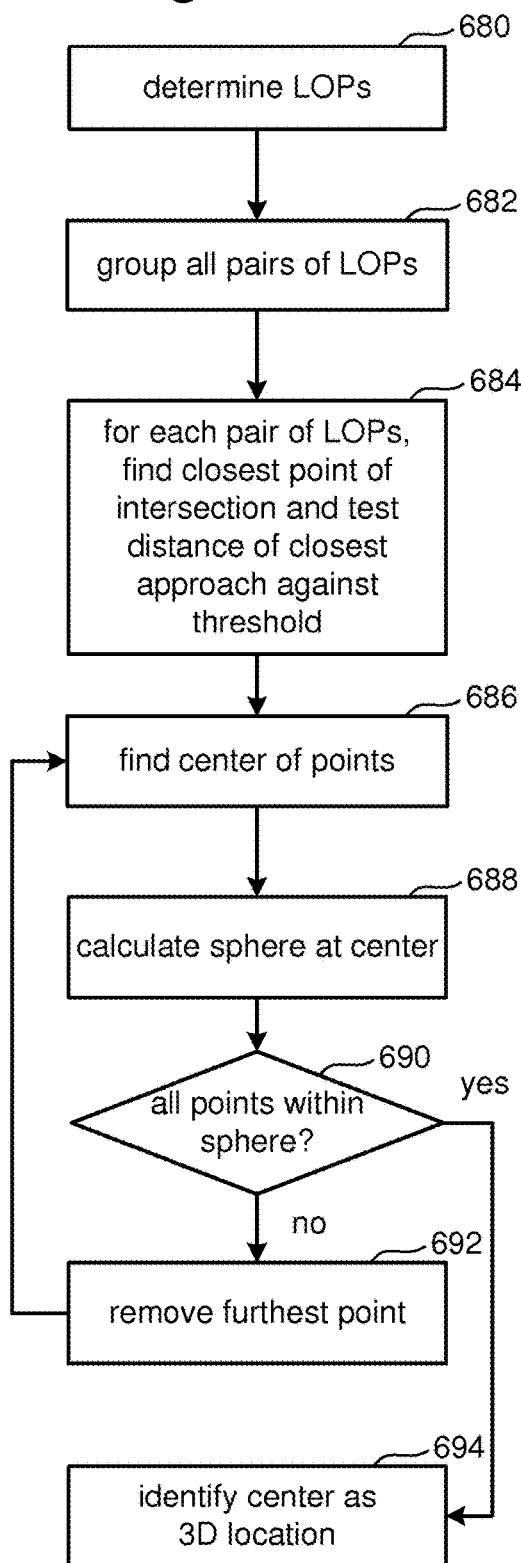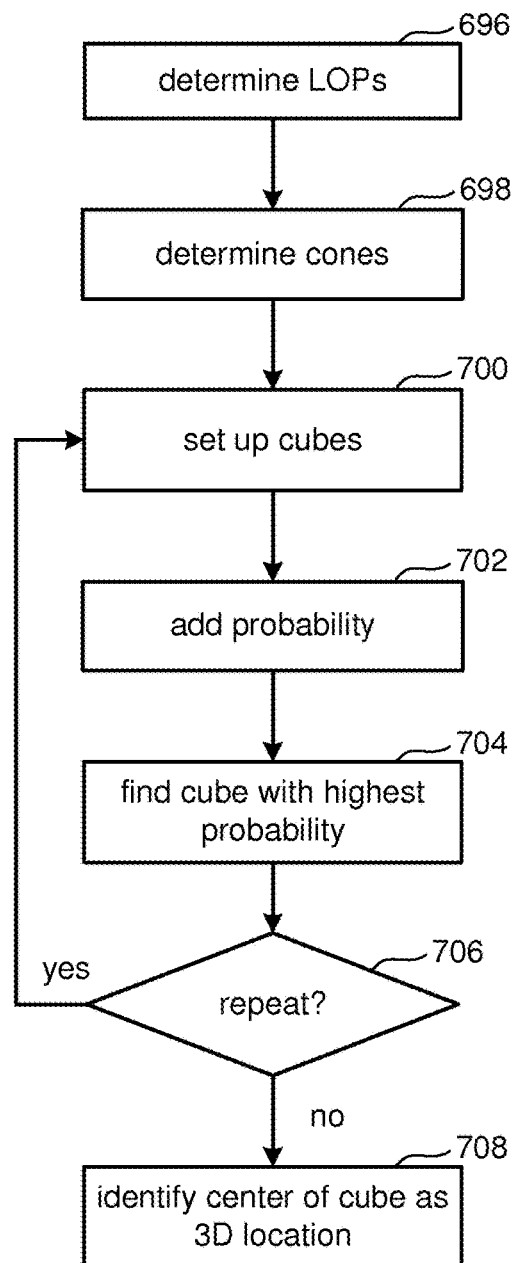

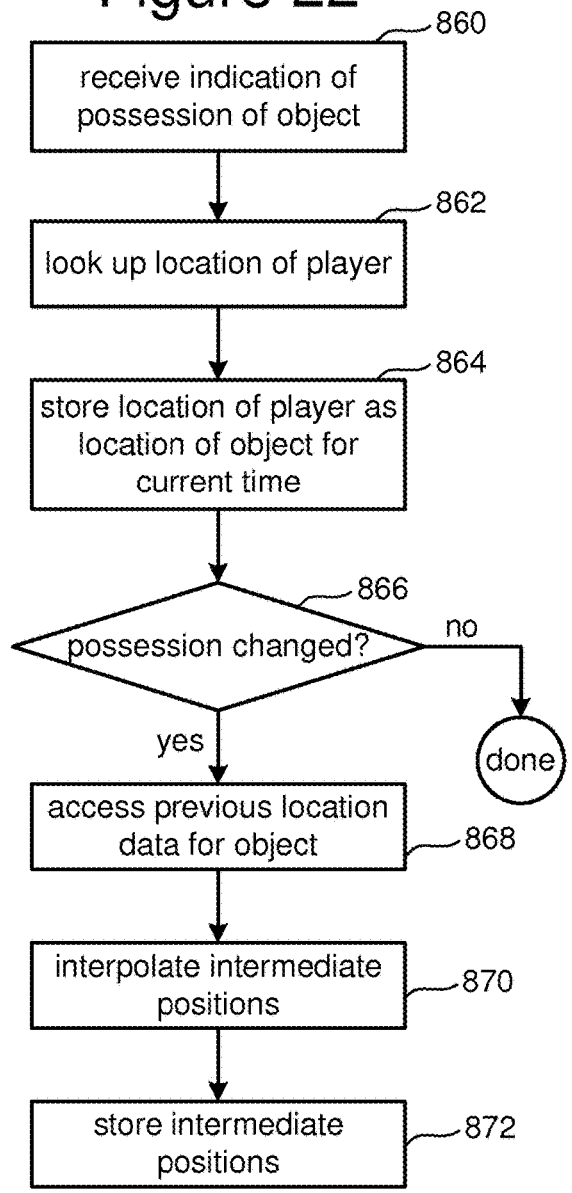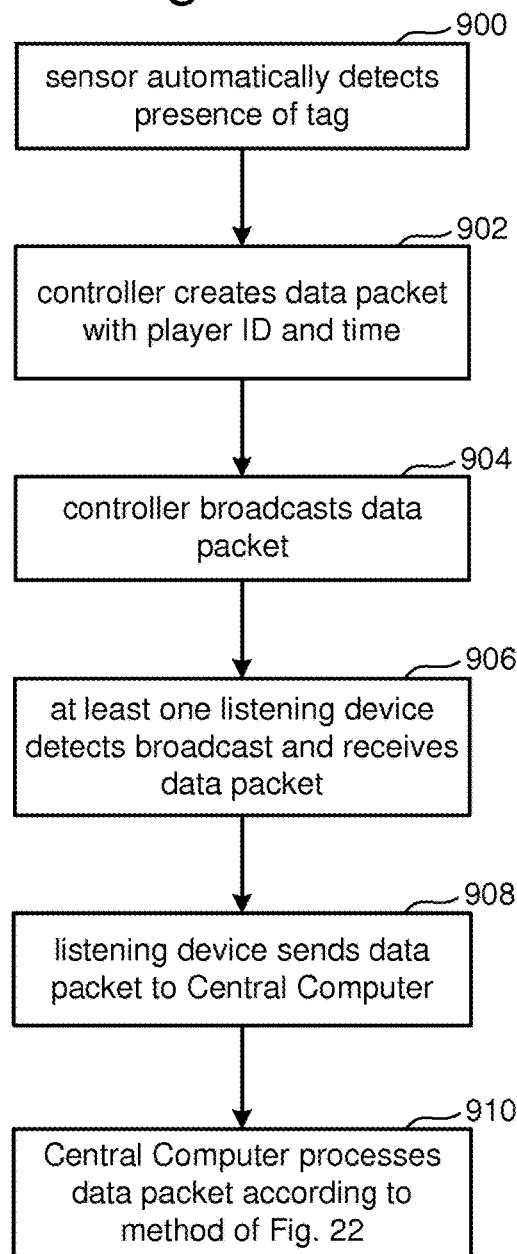

TRACKING SYSTEM

CROSS REFERENCES TO RELATED APPLICATIONS

This application is related to and claims priority to the following applications. This application is a continuation of U.S. patent application Ser. No. 16/838,588, filed Apr. 2, 2020, now U.S. Pat. No. 11,022,690, which is a continuation of U.S. patent application Ser. No. 16/362,225, filed Mar. 22, 2019, now U.S. Pat. No. 10,613,226, which is a continuation of U.S. patent application Ser. No. 15/489,333, filed Apr. 17, 2017, now U.S. Pat. No. 10,241,205, which is a continuation of U.S. patent application Ser. No. 14/506,969, filed Oct. 6, 2014, now U.S. Pat. No. 9,625,321, which is a continuation of U.S. patent application Ser. No. 12/906,012, filed on Oct. 15, 2010, now U.S. Pat. No. 8,884,741, which claims the benefit of U.S. Provisional Application No. 61/307,578, filed on Feb. 24, 2010, each of which is incorporated herein by reference.

BACKGROUND OF THE INVENTION

Field

The technology described herein relates to tracking objects.

Description of the Related Art

The remarkable, often astonishing, physical skills and feats of great athletes draw millions of people every day to follow sports that range from the power of football to the speed of ice hockey. Sports fans are captivated by the unique abilities of the individual players, as well as the coordination of the team. Fans have learned that what a player has done in the past may affect the player's ability to perform during the present. As a result, there has been an interest in tracking players and objects at sporting events.

BRIEF DESCRIPTION OF THE DRAWINGS

FIG. 7 is a timing diagram depicting the signals sent from the transmitters to the helmets.

FIG. 9 is a flow chart describing one embodiment of a process for operating a tracking system.

FIG. 10 is a flow chart describing one embodiment of a process for operating the Central Computer of the tracking system.

FIG. 11 is a flow chart describing one embodiment of a process performed by the RF Controller.

FIG. 12 is a flow chart describing one embodiment of a process performed by the RF Controller.

FIG. 13 is a flow chart describing one embodiment of a process for operating the transmitter.

FIG. 14 is a flow chart describing one embodiment of a process of operation for the electronics in a player's helmet.

FIG. 17 is a flow chart describing one embodiment of a process for determining a three dimensional location.

FIG. 18 is a flow chart describing one embodiment of a process for determining a three dimensional location.

FIG. 22 is a flow chart describing one embodiment of a process for tracking a ball or other object.

FIG. 23 is a flow chart describing one embodiment of a process for tracking a ball or other object.

DETAILED DESCRIPTION

I. Introduction

Figure 1:
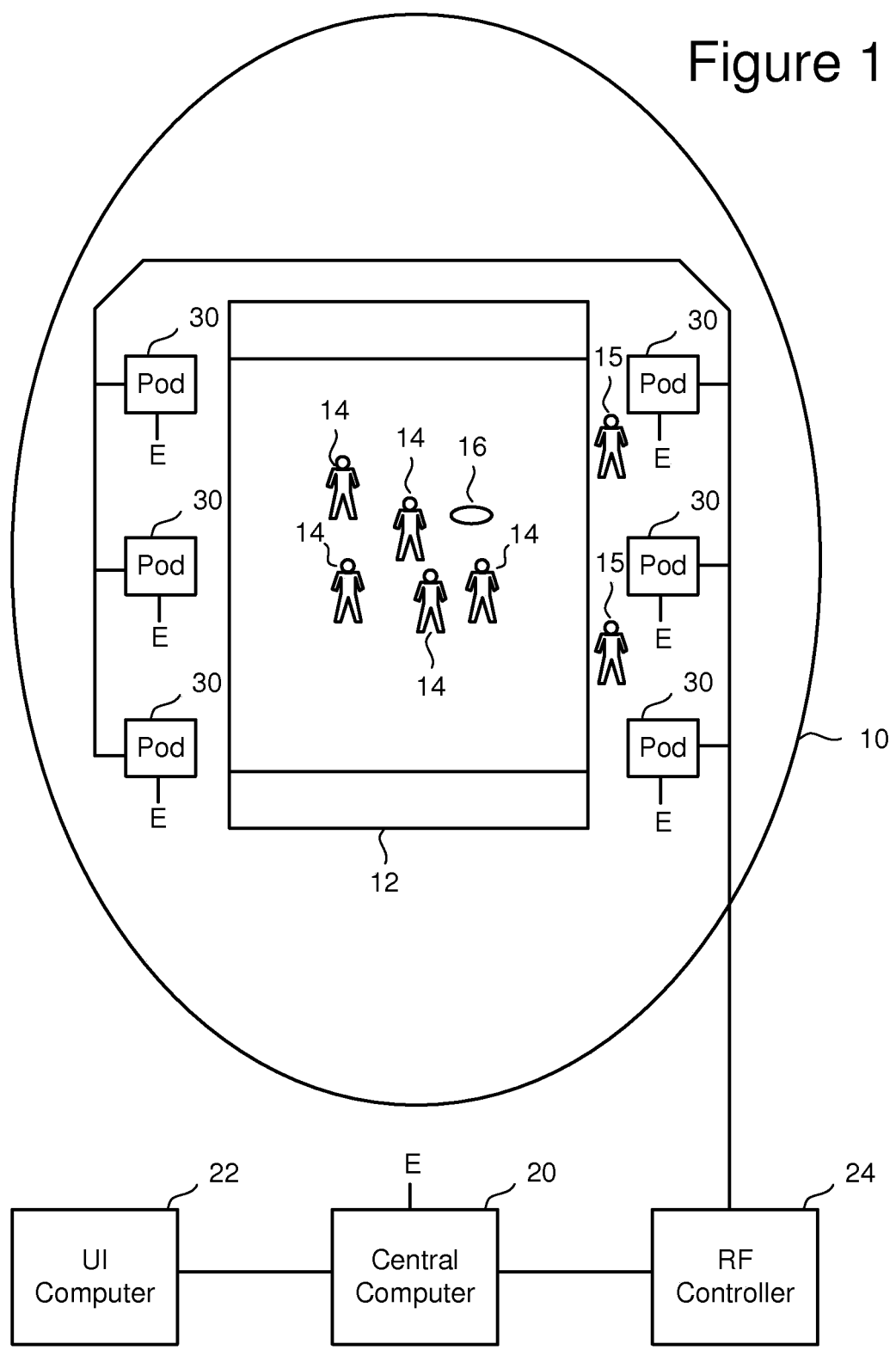
FIG. 1 is a block diagram of one embodiment of a system for tracking objects.

A system is disclosed that can track one or more objects at an event. In one embodiment, the system can automatically and simultaneously track multiple objects that are moving concurrently. The system can be used at sporting events or other types of events, and is not limited to any type of event or environment.

One example used below is to track players and a ball at a football game. In this example, the players each have a transponder in their helmet that responds to a query with an infra-red (IR) pulse. The system queries the players in a round-robin fashion, querying the players on the field more frequently than those on the bench or sidelines.

In one example embodiment, twenty IR cameras (pointed at the field) are mounted at six locations around the football stadium. These cameras are sensitive only to the narrow band of IR emission transmitted by the transponders in the players helmets. Additionally, the cameras are shuttered to coincide with the transponder pulses. In one example, all cameras open their shutters for 1/10,000th of a second, and they do this two hundred times per second. In another embodiment, the system opens the cameras' shutters one hundred and fifty six times per second. Each time the cameras open their shutter, one (or more) of the player transponders flashes a 1/10,000th second IR pulse. Due to the very fast shutter pulse synchronized with the IR pulse, along with an IR filter on each camera that permits only the very narrow band of IR transmitted by the transponders, each of the cameras should see one bright dot (per target) on a generally dark background (at least locally dark—it seems that in some embodiments the football field can be as bright as the LED—but the non-lit helmet presents a dark background as compared to the helmet during a flash). In one embodiment, to further distinguish the transponder from the background, the system uses a differencing algorithm to subtract an image formed by combining images immediately before and after the target frame from the target frame.

One aspect of this tracking system is the individual addressing of each object (e.g. player/helmet) to be tracked. The stadium is to be instrumented with six RF transmitters in communication with a central control computer. More or fewer than six RF transmitters can also be used. A Central Computer will send a message out to each of the transmitters for each IR video frame (e.g., two hundred frames per second) to indicate which player is to be addressed. These six transmitters are distributed around the field to add spatial diversity (and, therefore, robustness) to the RF addressing scheme. Each RF transmitter in turn will then send out a short message indicating which helmet transponder (player) is to pulse, and a countdown indicating the time that the pulse must occur. This countdown increases addressing robustness significantly through temporal diversity. The transponder need only receive a message packet from one of the six transmitters to know when it is to output a pulse. At the specified output time, each of the six transmitter modules will send out a simultaneous pulse to the co-located IR cameras (as many as four, or a different number, at each transmitter location). Each IR camera then captures an image while the target transponder is outputting its IR pulse, and sends that image to its dedicated co-located computer. The co-located computer finds the target (or targets) in the image, and sends the target's pixel coordinates and description to the Central Computer for tracking.

This active addressing approach allows for automatically tracking multiple targets simultaneously, and alleviates the need for manual interaction to identify targets as specific players. The system will use "adaptive" triggering in order to track the most important targets at the highest temporal resolution. One embodiment includes identifying locations for all players on the field five times per second. The system will also identify players that are off the field once every two seconds. In addition, referees and fixed registration landmarks will each be identified once per second. The moment a player (previously off the field) is detected as being on the field, that player's frequency of location identification will automatically be increased to five times per second. Other frequencies can also be used.

Alternative embodiments include identifying two or more players in a single frame if those players cannot be confused from one another (e.g. players on opposite team benches). Another alternative includes moving a player up in the list to be identified in the event that player wasn't identified in the last round, is carrying the ball, has just undergone unusually high acceleration, etc. In another alternative, the system will modify the sequence by identifying skilled players (e.g., quarterback) at a higher frequency than others (e.g., linemen).

II. System

FIG. 1 is a block diagram depicting one example system that can automatically track multiple objects that are simultaneously moving in real time. The system can be used at a live sporting event or other type of event. The system is not limited to any particular type of application or event. For example purposes, the system will be described below with respect to an American football game; however, the system is not limited to an American football game and can be used with many other environments.

FIG. 1 shows football stadium 10 that includes football field 12. On field 12 are players 14 and ball 16. In some games, there can be multiple balls. The system described below will automatically track players 14 and ball 16 as they simultaneously (or not simultaneously) move about field 12 and move off field 12. For example, FIG. 1 shows players 14 on field 12 and players 15 off field 12. The players 15 can also be tracked simultaneously with the players 14. Additionally, the system can determine whether the players are on or off the field.

The automatic tracking system includes Central Computer 20 in communication with a User Interface Computer (UI computer) 22 via Ethernet or RS-232. The system also includes RF Controller 24 in communication with Central Computer 20 via RS-232, or other communication means. Surrounding field 12 are six transmitter/sensor pods ("pods") 30. Each pod 30 includes one or more RF transmitters and one or more sensors. In one embodiment, each pod 30 includes four IR cameras/sensors. In some embodiments, some of the pods 30 will include four IR cameras/sensors and other pods will include more or fewer than four IR cameras/sensors (e.g. three or five) so that there is a total of 20 IR cameras/sensors in the system. Each of the pods 30 will communicate with Central Computer 20 via Ethernet (indicated by "E" in FIG. 1). Each of the pods 30 will also communicate with RF Controller 24 via an RS-422 line. In one embodiment, an RS-422 line will be connected to RF Controller 24 and wired throughout the stadium. Each of pods 20 can connect to that RS-422 line in a daisy-chain configuration. In some embodiments, the pods are connected in parallel on the RS-422 line.

In general, a human operator will interact with UI Computer 22 to see the real-time operational results of the tracking system of FIG. 1, and provide instructions to the system. Central Computer 20 controls the operation of the automatic tracking system, determines the actual locations of the objects being tracked and provides commands to the other components in order to perform the tracking. For example, Central Computer 20 will indicate to RF Controller 24 the frequency with which various objects should be tracked. In one embodiment, Central Computer 20 issues each player triggering commands itself. It does this through the RF controller, but doesn't tell the controller anything of the frequency the player will be tracked at. RF Controller 24 will send commands to each of the transmitters in pods 30 instructing the transmitters which players should have their position sensed at which time. That information will be transmitted wirelessly using the RF transmitters in pods 30 to transponder circuits on players 14 and 15. At the appropriate times, wireless sensors in pods 30 will detect players 14/15 and transmit information about the detection back to Central Computer 20 via the Ethernet (E) so that Central Computer 20 can calculate the three-dimensional locations of each of the players 14/15. Details of tracking ball(s) 16 will be provided below.

In one example, pods 30 are located above the field level. For example, they can be mounted in portions of the stadium that are raised above the field level. In one embodiment, they are positioned around the field to provide spatial diversity so that all portions of the field are in view of multiple pods 30.

Figure 2:
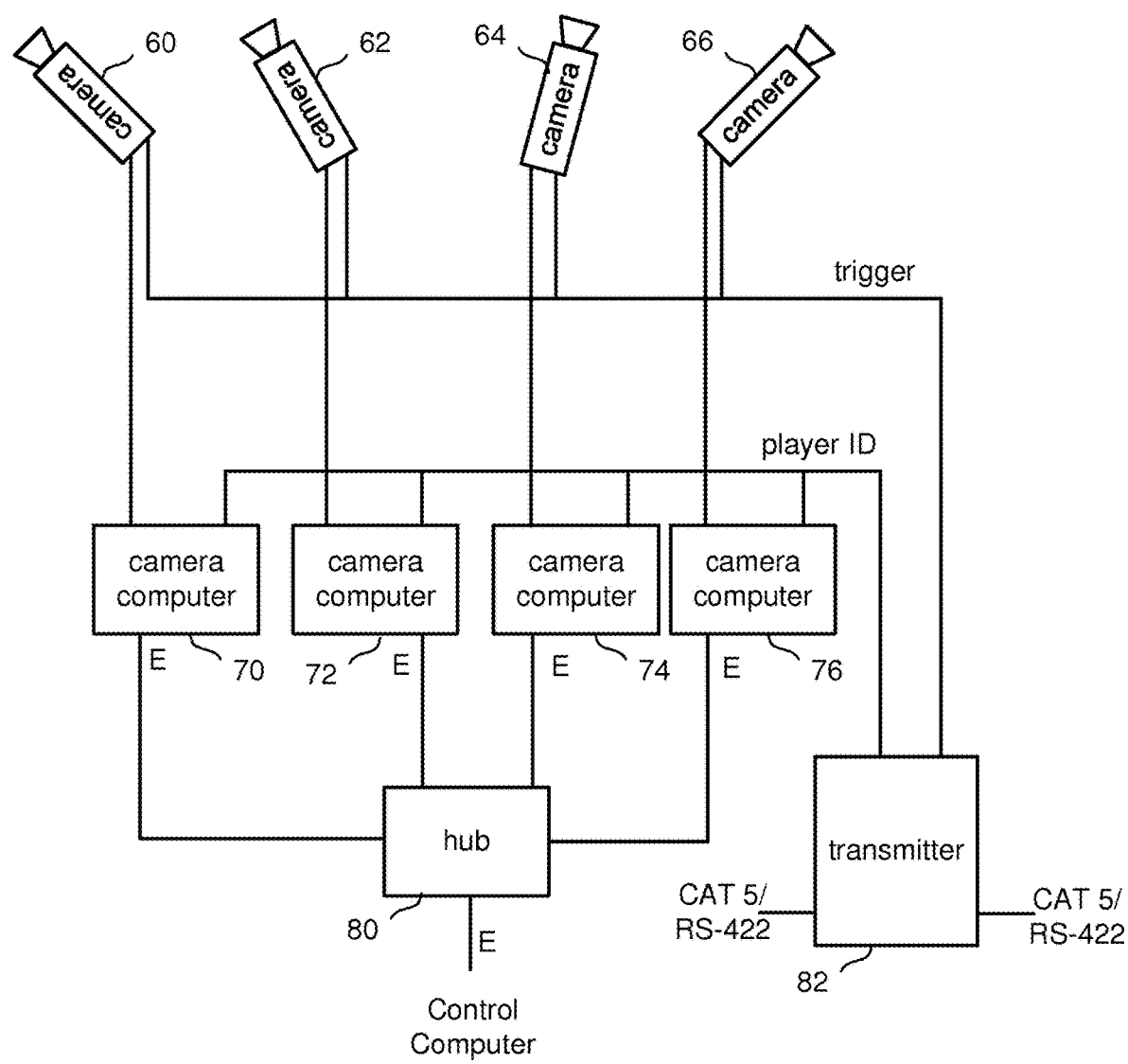
FIG. 2 is a block diagram of one embodiment of a camera/transmitter pod for use with the system of FIG. 1.

FIG. 2 is a block diagram depicting one embodiment of the components of a pod 30. This particular embodiment includes four IR cameras/sensors 60, 62, 64 and 66. In one embodiment, the cameras/sensors can be digital video cameras, digital still cameras, analog video cameras or analog still cameras. In one embodiment, the cameras can be dedicated for IR sensing. In another embodiment, the cameras can be manufactured for sensing a range, or ranges of, wavelengths and filters can be used to restrict the sensing to IR or other specific ranges. In one example implementation, the cameras are Prosilica GE 680 monochrome 640.times.480 digital video cameras that capture up to two hundred frames per second and transmit that data uncompressed on a 1 GB Ethernet. In one embodiment, each of the cameras will open a shutter for 1/10,000th of a second. The CCD of that camera can respond to light in the IR wavelengths as well as other wavelengths. In one embodiment, a band pass filter is placed in front of the lens to only allow IR light at 850 nm+/−10 nm. In other embodiments, other cameras can also be used or other types of sensors (e.g., other than cameras) can be used.

Each of the cameras of pod 30 is connected to a dedicated camera computer via Ethernet. For example, camera 60 is connected to camera computer 70, camera 62 is connected to camera computer 72, camera 64 is connected to camera computer 74, and camera 66 is connected to camera computer 76. In one embodiment, the camera computers 70, 72, 74 and 76 are dual core Intel atom-based computers. In one example implementation, each camera computer is a single printed circuit board (and components—and perhaps one or more daughter boards) and pod 30 will include a rack with all four boards inserted in the rack. Each of the camera computers 70, 72, 74 and 76 are connected to a hub (or switch) 80 which provides an Ethernet connection E to Central Computer 20.

In one embodiment, each of the football players will be wearing a helmet. The helmet will instrumented with a transponder. That transponder will receive an RF signal from one or more transmitters of pods 30 instructing that transponder to send out an electromagnetic signal. In response to receiving the RF signal from a transmitter, the appropriate helmet transponder will send out its electromagnetic signal at the designated time. In one embodiment, the electromagnetic signal is a continuous wave infrared burst. Camera 60, 62, 64 and 66 will be commanded to capture an exposure that largely coincides with the timing of the IR signal from the helmet's transponder. One or more of cameras 60, 62, 64 and 66 will ideally sense the IR signal from the helmet's transponder. The IR signal will be appear as a cluster of pixels in the captured image of the camera. The output images from cameras 60, 62, 64, and 66 are sent to camera computers 70, 72, 74 and 76 to identify where in the image the IR signal source is detected. Camera computers 70, 72, 74 and 76 will then transmit data packets to Central Computer 20 via the Ethernet.

The data packs transmitted from camera computers 70, 72, 74 and 76 to Central Computer 20 will include the following information: (x,y) weighted centroid of each pixel cluster in CCD coordinates, min and max extents of each cluster in CCD coordinates, player ID, time, peak pixel value in each cluster, "total energy" (this is simply the sum of pixel values for the cluster) of each cluster, and camera ID. The player ID identifies which player the given candidate clusters correspond to, and has been provided to the camera computer by transmitter 82 (see below). The time is the computer time of the control computer. The brightness is the highest brightness value of all the pixels in the cluster of pixels detected. The total energy is the sum of all brightness values in the cluster of pixels. Each camera has a unique identification, which is transmitted as camera ID. The local computers 70, 72, 74 and 76 also transmit diagnostic information to Central Computer 20.

Pods 30 also include transmitter board 82. In one embodiment, transmitter board 82 can receive the RS-422 signal sent out by RF Controller 24. In one example embodiment, the RS-422 signal is sent on a Cat5 table. Note that FIG. 2 does not show the power supply which provides power to all the components.

Figure 3:
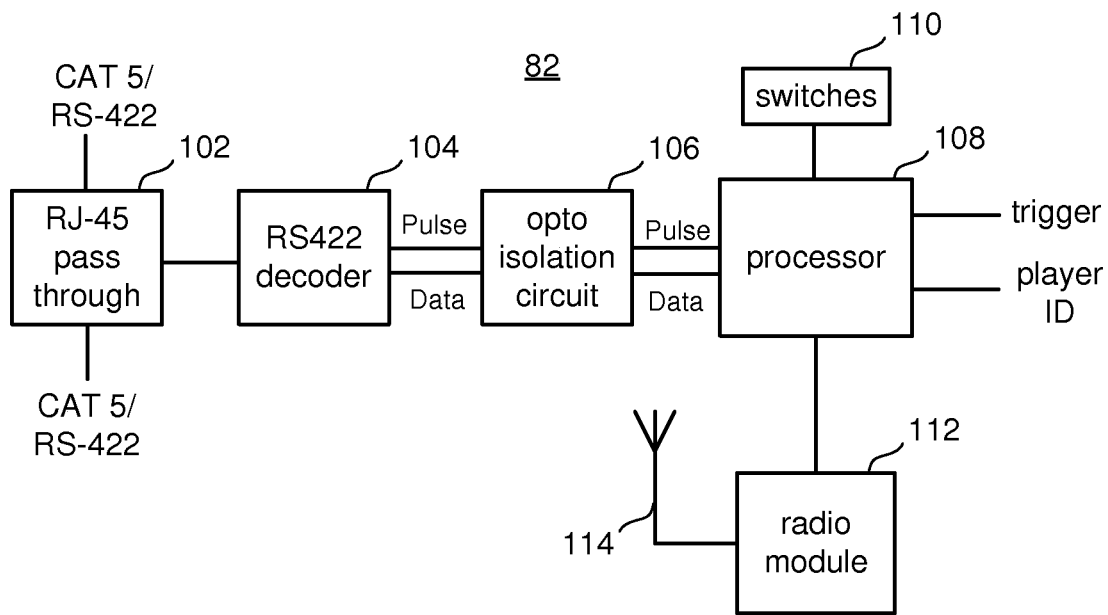
FIG. 3 is a block diagram of one embodiment of a transmitter.

FIG. 3 is a block diagram depicting one example embodiment of the components of transmitter board 82 (see FIG. 2). Transmitter board 82 includes an RJ-45 pass-through 102, RS-422 decoder 104, opto-isolation circuit 106, processor 108, switches 110, radio module 112, and antenna 114. RJ-45 pass-through 102 can connect to the Cat5/RS-422 line from RF Controller 24. RJ-45 pass-through will not change on the Cat5/RS-422 line. Rather, it provides a pass-through for the signal and transmits a copy of that signal to RS-422 decoder 104. In one embodiment, RS-422 decoder 104 will decode the signal to read the transmitted information. In one embodiment, the transmitted information includes a Pulse signal to be used as a trigger and a Data signal (e.g., commands) to identify which players need to be tracked at which times. More information will be provided below.

The pulse and data information will be transmitted from RS-422 decoder 104 to opto-isolation circuit 106, which will provide electrical isolation between the Cat5/RS-422 line and processor 108. The Pulse signal received by processor 108 from opto-isolation circuit 106 will tell processor 108 when to trigger the cameras in the respective pod 30. The Data signal received by processor 108 from opto-isolation circuit 106 indicates which player ID is to be tagged to the resulting cluster data. Switches 10 are hard switches which provide a unique ID for pod 30 or the particular transmitter board 82.

Processor 108 sends a, trigger signal, to each of the cameras 60, 62, 64 and 66 in order to trigger the start of the cameras' exposure (e.g., trigger the camera to capture an image). Processor 108 will also send a signal, player ID, to each of the camera computers 70, 72, 74 and 76 indicating to the camera computers which player the cameras are sensing when for a given exposure. Processor 108 will also send a signal to radio module 112 indicating which is the next player that should output an IR pulse to be sensed by the cameras. Radio module 112 will send out that information as an RF signal via antenna 114. In one embodiment, processor 108 is an Atmel Atmega 48P processor, the trigger signal and player ID signal are serial signals, and radio module 112 is a CC2520 from Texas Instruments. Other hardware can also be used. In alternative embodiments, radio module 112 can be replaced with an IR transmitter so that the data can be transmitted to the helmets (or other objects) using IR signals. The RF signal will be sent out at an amount of time preceding the commanded IR pulse that is determined by the switch positions (which indicate the node ID).

Figure 4:
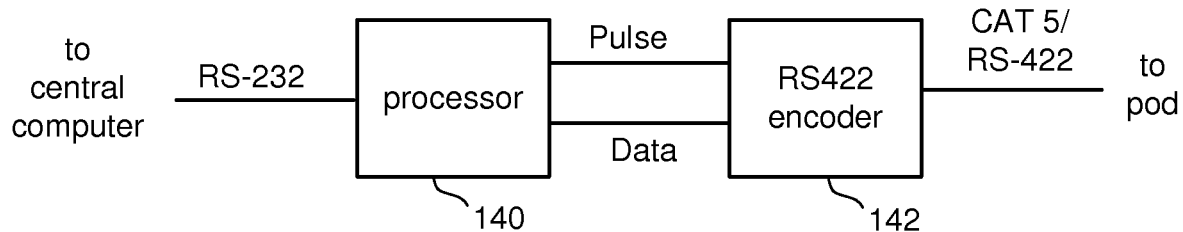
FIG. 4 is a block diagram of one embodiment of an RF Controller.

FIG. 4 is a block diagram depicting one example embodiment of the components of RF Controller 24 (see FIG. 1). In one embodiment, RF Controller 24 includes a processor 140 and RS-422 encoder 142. One example of a suitable processor is an Atmel ATTINY 2313 processor. In one embodiment, processor 140 communicates with Central Computer 20 via an RS-232 line in order to receive commands and other information, described below, that indicates the timing of when various players should be tracked. Processor 140 will then create two signals: Pulse and Data. The Pulse signal commands the beginning of the exposure of the cameras and when the helmet transponders should output an IR pulse to be detected by the cameras/sensors. The Data signal from processor 140 indicates which is the next player to be sensed. Both the Pulse and Data signals are sent from processor 140 to RS-422 encoder which encodes the signals onto an RS-422 signal to be sent on the Cat5 line to the pods 30.

The Cat5 cable has four pairs of wires. One pair is used for the Pulse and one pair is used for the Data. The other two pairs are grounded. The Pulse signal is a square wave. The data signal will include a player ID. The player ID can be a number or other alphanumeric character. To generate the Pulse signal, processor 140 will be used to create a high precision clock signal in order to appropriately time the Pulse signal.

Figure 5A:
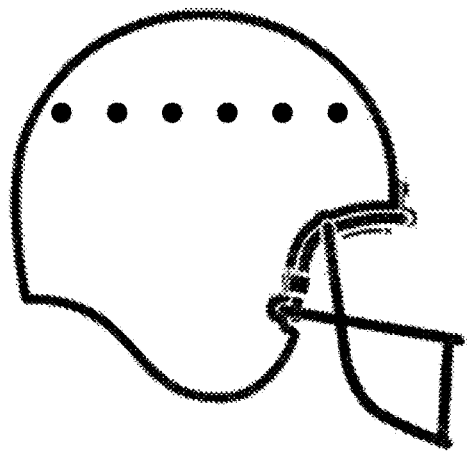
FIGS. 5A and 5B depict helmets.
Figure 5B:
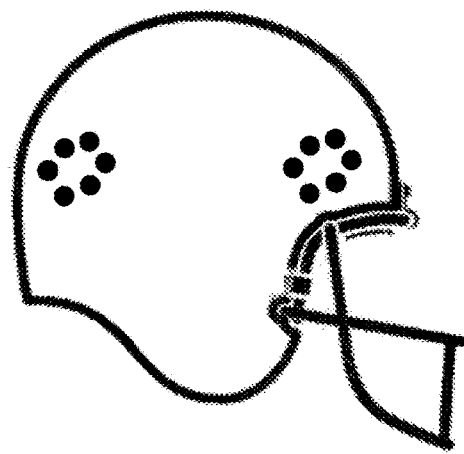

As discussed above, in one embodiment, each of the players will wear a helmet with a transponder positioned in the helmet. In some embodiments, there will also be transponders in the referees' hats as well as fixed transponders on or around the field for automatic registration). FIGS. 5A and 5B provide two embodiments of helmets. Inside the helmet will be a helmet transponder circuit. This circuit will include a set of IR emitting LEDs. In one embodiment, the LEDs can be manufactured to specifically output IR energy only. In other embodiments, the LEDs can be manufactured to transmit at various wavelengths and a filter can be placed over the LEDs so that only IR spectrum (or some portion thereof) is transmitted In some embodiments, it is desirable that the output of the LEDs is electromagnetic signals that are not in the visible spectrum so that these LEDs do not interfere with the game or event.

The circuit inside the helmet will be mounted on a circuit board and that circuit board will be mounted in a location in the helmet that will not interfere with the player or the player's safety. For example, many helmets have padding, and the circuit board can be placed underneath or between padding. The LEDs will be mounted to the helmet shell. In one embodiment, holes will be drilled in the helmet from the exterior surface of the helmet to the interior surface of the helmet. The LEDs will be positioned in these holes, recessed from the surface of the helmet. A clear coating will be in front of the LEDs, at the surface of the helmet, to protect the LEDs. This protective layer may have an appearance that will minimize the visual impact of the LED, but will be largely transparent to the IR wavelengths in question. In one embodiment, the clear coating can be a clear urethane adhesive. The back of the LEDs will include wires to the circuit board. In one embodiment, each helmet will have twenty four LEDs that are narrow bandwidth LEDs that transmit IR at approximately 850 nm+/−20 nm. One example LED is a Vishay TSHG-6400.

In the embodiment of FIG. 5A, the LEDs are arranged as a crown around the helmet at 17 degrees above the horizon. In the embodiment of FIG. 5B, the LEDs are arranged as four clusters of six LEDs per cluster. Two clusters are on one side of the helmet and two clusters are on the other side of the helmet. On each side of the helmet, there is one cluster in front of the typical logo position of the helmet and one cluster behind the logo position of the helmet. The helmet of FIG. 5B does not show a logo, but in many instances the logo is in the center of the side of the helmet. Other arrangements for the LEDs, in addition to those depicted in FIGS. 5A and 5B, can also be used. Note that in one embodiment, each of the clusters of LEDs is electrically in parallel to each other. Within each cluster, there are two sets of LEDs electrically in parallel with each other. Each set has three LEDs in series.

Figure 6:
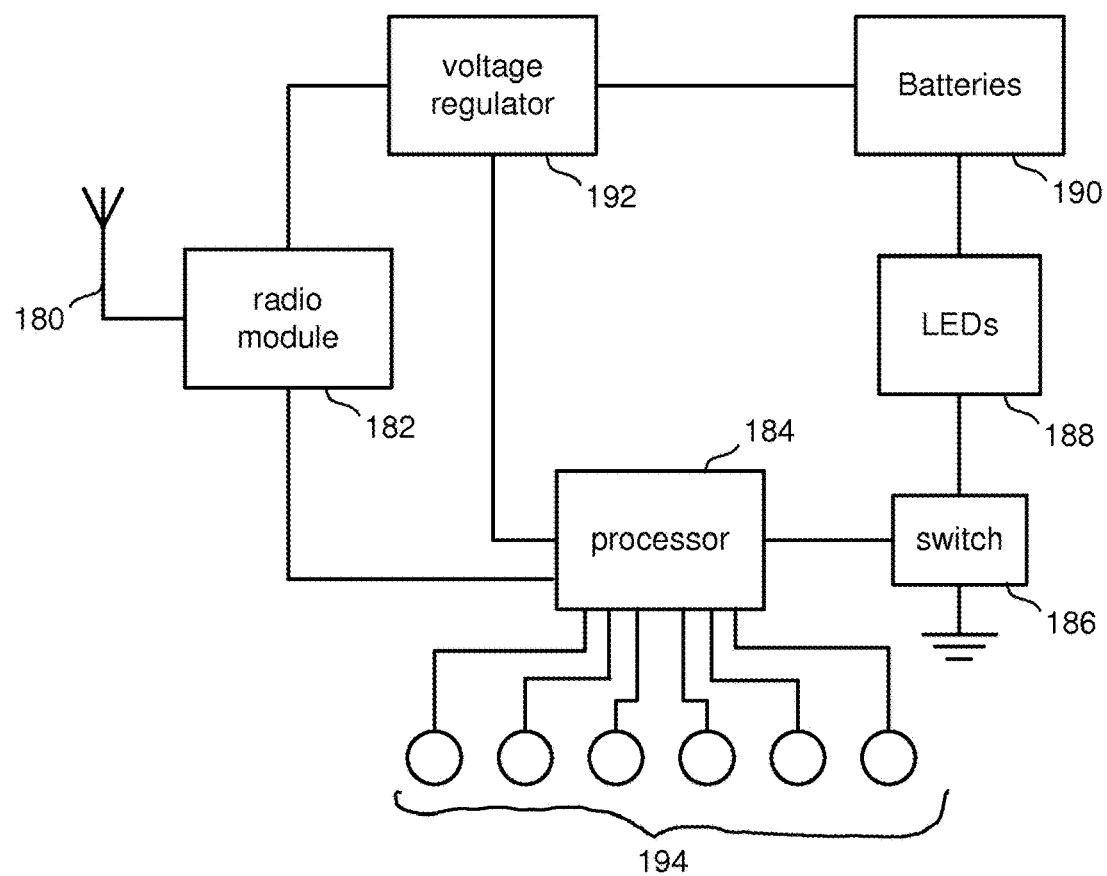
FIG. 6 is a block diagram of one embodiment of a circuit that can be positioned in a helmet.

FIG. 6 is a block diagram depicting one example embodiment of the components of the helmet transponder circuit that is mounted inside the helmet of the player. In this example, the helmet transponder circuit includes an antenna 180, radio module 182, processor 184, switch 186, LEDs 188, batteries 190, voltage regulator 192 and accelerometers 194 In one embodiment, processor 184 is an MSP430 from Texas Instruments and radio module 182 is a CC-2520 from Texas Instruments, and switch 186 is a field effect transistor. Processor 184 is connected to radio module 182, switch 186 and voltage regulator 192. Switch 186 is also connected to ground and LEDs 188.

Radio module 112 of transmitter 82 in pods 30 sends out an RF signal with data via antenna 114. That signal, which indicates which helmet transponder should output an IR pulse, is broadcast to all the helmet transponders on the field. Therefore, every player is capable of receiving that transmission. Because there can be reasons why a particular helmet transponder will not receive a transmission from a particular transmitter, as discussed above, there are six transmitter/sensor pods so that there are six transmitters transmitting the same information (at different times). Each of the helmets will receive the six signals (or less than the six signals) via antenna 180 and radio module 182. The data received will be sent to processor 184. Based on the signal received at processor 184, the processor will determine whether it is the particular helmet transponder circuit's turn to transmit its IR pulse. When it's time for the helmet transponder to transmit an IR pulse, processor 184 will actuate switch 186 to turn on LEDs 188 for $\frac{1}{10,000}$th of a second. LEDs 180 are also connected to batteries 190. Voltage regulator 192 provides power to radio module 182 and processor 184 from batteries 190.

FIG. 6 also shows a set of set single axis accelerometers 194. In other embodiments, multi axis accelerometers can also be used. These accelerometers 194 are distributed around the head of the player by appropriately mounting them in the helmet. The accelerometers allow processor 184 to automatically determine whether a potentially dangerous impact has occurred (e.g., causing a concussion). The use of the accelerometers allows the transmission of such impact data in real time (or near real-time).

FIG. 7 is a timing diagram describing the operation of transmitter board 82 with respect to transmitting information to helmet transponder circuits (see FIG. 6). The first signal depicted in FIG. 7 is the trigger signal. This is the signal provided by transmitter 82 as trigger to each of the cameras 60, 62, 64 and 66 (see FIG. 2). The trigger signal can be the same as or based on the Pulse signal sent from RF Controller 24 to each of the transmitter boards B2.

At the same time the Pulse signal is sent to the transmitter boards 82 from RF Controller 24, the data is also sent. The Pulse signal indicates when to pulse for the last set of data. The data sent with the pulse indicates what is the next helmet that will transmit when the next time the pulse is provided. Each of the transmitters will receive that data and broadcast that data using a digital signal over a 2.4 GHz (WiFi) direct sequence spread spectrum signal. To provide temporal diversity, each of the six transmitters (e.g., one transmitter per pod 30, and six pods 30) will transmit at different times, as depicted in FIG. 7. For example, TX0 shows the signal from transmitter 0, TX1 shows the signal from transmitter 1, TX2 shows the signal from transmitter 2, TX3 shows the signal from transmitter 3, TX4 shows the signal from transmitter 4 and TX5 shows the signal from transmitter 5.

When each of the signals depicted in FIG. 7 are low, no signal is being sent. When FIG. 7 shows the signal high, data is sent. In one embodiment, each transmitter will send three pieces of data: a player ID, the time to pulse and timing information in order to start counting the time to pulse. In one embodiment, the timing information is a predetermined rising edge of a part of the signal (e.g. first rising edge, or different rising edge). The time to pulse information will provide an indication of the time between the rising edge of the timing info and the rising edge of the next trigger signal. Because each transmitter transmits at different times, that time to pulse information will be different for each transmitter, however, the player ID(s) transmitted from each transmitter will be the same. FIG. 7 shows each transmitter transmitting at a different time. In one embodiment, each transmitter will start its transmission 800 .mu.s after the previous transmitter started its transmission. For example, transmitter TX0 will start its transmission 800 .mu.s after the start of the trigger, transmitter TX1 will start its transmission 800 .mu.s after the start of the transmission from TX0, transmitter TX2 will start its transmission 800 .mu.s after the start of the transmission form TX1, etc. The bottom signal of FIG. 7 is the signal received by an example helmet transponder circuit. This shows the helmet receiving transmissions from all six transmitters. In some instances, the helmet will receive information from a subset of transmitters. By using multiple transmitters at different locations at different times, the system provides a level of fault tolerance.

Figure 8A:
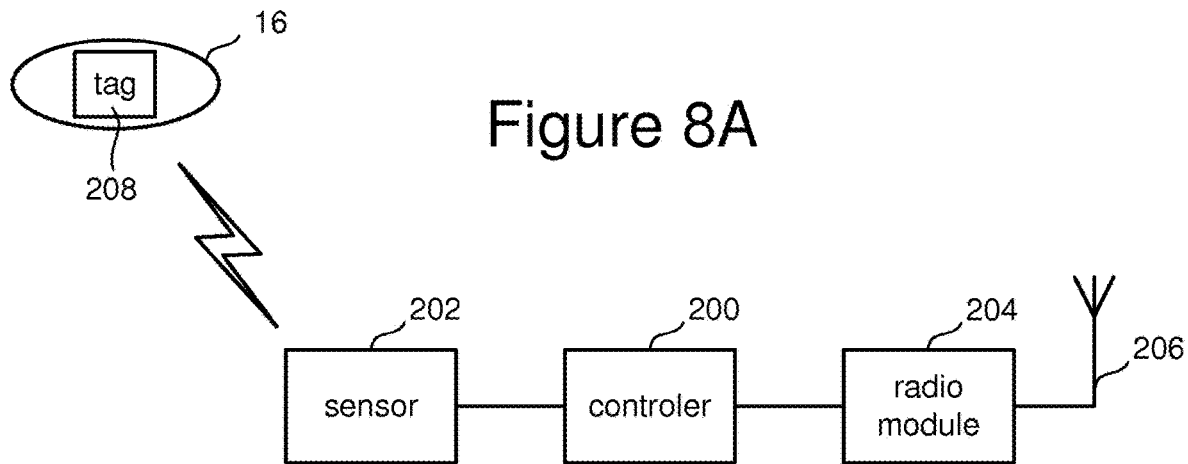
FIG. 8A depicts one embodiment of an RFID tag system.
Figure 8B:
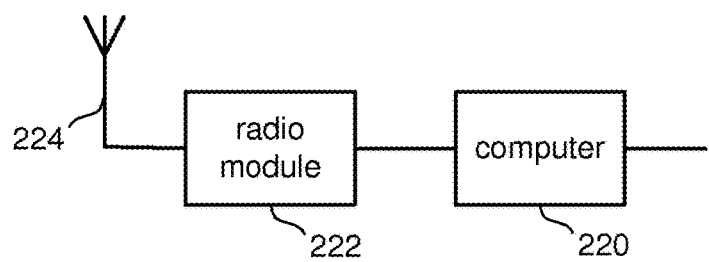
FIG. 8B depicts one embodiment of an RFID listening station.

The system also includes multiple options for tracking ball 16 (or other objects). Many of these embodiments will be discussed below. In one embodiment, the system uses an RFID tag in ball 16. FIGS. 8A and 8B provide example embodiments of hardware used to implement the RFID tag. For example, FIG. 8A shows ball 16 with an RFID tag 208 embedded in ball 16. For example, the RFID tag can be between the bladder and leather of the ball. RFID tag 208 can also be mounted in other portions of the ball. In one embodiment, each player will have one or more RFID tag reading circuits positioned on the player. For example, the RFID circuits can be positioned on shoulder/chestpads, pants, the helmet, elbow pads, gloves, wristbands, etc. A player could have one RFID tag circuit or multiple RFID tag circuits.

In one embodiment, an RFID tag circuit includes controller 200 in communication with sensor 202 and radio module 204. The radio module 204 is connected to antenna 206. Sensor 202 can be any standard RFID tag reader known in the art that is small. Controller 200 can be any suitable processor known in the art. Radio module 204 can be CC2520 from Texas Instruments, or another suitable radio module. The system will also include a battery/power source.

In embodiments that have multiple RFID tag circuits mounted on a player, each of the RFID tag circuits can include its own sensor, controller and radio module. In other embodiments, each RFID tag circuit will include its own sensor and controller, but will share a common radio module. In other embodiments, each RFID tag circuit will include its own sensor, but will share a common controller and radio module. The multiple sensors should (but are not required to be) distributed throughout the player's body. Sensor 202 is used to automatically sense that tag 208 is in proximity of sensor 202. In other words, sensor 202 is used to determine that the ball 16 is in proximity to player 14. Upon detecting the presence of tag 208, the sensor will provide a signal to controller 200 which will instruct radio module 204 to send a signal (via antenna 206) indicating: current time, an ID for sensor 202 and an ID for tag 208. In one embodiment, tag 208 will transmit its ID to sensor 202. For tracking the ball, the time can be sensed at the listening station (helmet, sideline, etc.), and the ball ID will most likely not be needed.

In one embodiment, will be a set of listening stations positioned around field 12. FIG. 8B depicts an example listening station. In one implementation, the listening stations can be at field level; however, other positions can also be utilized. Each listening station will include a computer 220 connected to a radio module 222. Via antenna 224, radio module 222 can receive signals from radio module 204 of the RFID tag circuits on players indicating that a player has sensed the presence of the ball in proximity to the player. That information will be provided to computer 220, which will transmit the information to Central Computer 20 via Ethernet. More details of the ball tracking will be provided below. Alternatively, the RFID receiver may use Bluetooth (or similar) to transmit the signal to the helmet—which will effectively relay the signal further (to the field receivers, or to the 6 nodes discussed above).

In the above discussion, football was used as an example. Another example can include tracking hockey players and an ice hockey puck. An example of tracking an ice hockey puck is found in U.S. Pat. No. 5,862,517, incorporated by reference herein in its entirety. When tracking hockey players, the electronics described for the football helmet can also be placed in the hockey helmet. Alternatively, the electronics can be placed on top of the hockey helmet in a channel, commonly found on hockey helmets. Additionally, in an alternative embodiment, the hockey helmet may only include six LEDs on top of the helmet because it is possible to put a set of cameras on the catwalk/rafters at the top of the arena. Other types of objects can also be tracked.

III. Operation

FIG. 9 is a block diagram describing one embodiment of the operation of the system described above. In step 302, the system is registered. In order to track moving objects, the system needs a reference from which to identify locations. Registration provides that reference, as described below, and appropriately calibrates the system in light of that reference. In step 304, the system will automatically track players/objects that are simultaneously moving and store that tracking data. In step 306, the system will report the tracking data. Although the steps in FIG. 9 are shown in a particular order, the steps do not necessarily need to be performed in that order. That is, the process of registering the system can start prior to step 304 and then also performed during step 304 and 306. Similarly, step 306 can be performed during or after step 304. Reporting the tracking data, step 306 includes storing the data in a relational database, creating an animation depicting the motion of the various objects being tracked, highlighting/enhancing various moving objects in video or still images, reporting about the motion via alerts, text messages, e-mails, etc. U.S. Pat. No. 5,912,700, incorporated herein by reference in its entirety, provides a suitable example of using tracking data to highlight/enhance various moving objects in video.

FIG. 10 is a flowchart describing one embodiment of the operation of Central Computer 20 when tracking players/objects and storing tracking data (step 304 of FIG. 9). In step 330 of FIG. 10, Central Computer 20 will send out initial commands/instructions to RF Controller 24 indicating times for the helmet transponders to transmit the their respective IR pulses. In step 332, Central Computer 20 will determine three-dimensional locations of each of the objects being tracked. In step 334, Central Computer 20 will determine which players/objects 14 are on the field 12 and which players/objects 15 are off the field. This is used to determine the frequency for sampling data for each of the players. Central computer 20 can determine which players are on the field and which players are off the field by comparing the three-dimensional locations of the players to the known location of the field. In step 336, Central Computer 20 may (optionally) dynamically change the commands/instructions to RF Controller for indicating frequency or timing of obtaining data from each of the helmet transponders.

After step 336, FIG. 10 shows the process looping back to step 332 so that the method can repeat. In some embodiments, the order of the steps 332-336 can vary so that one or more (or a portion) of the steps can be performed concurrently or in a different order. In one embodiment, Central Computer 20 will dynamically change the commands based on one or more occurrences in the event being monitored by, for example, adding or removing one or more objects from the commands sent to the RF Controller or changing the frequency that various objects are tracked. For example, as discussed above, players determined to be on the field are tracked at a first frequency and players determined to be off the field are tracked at a second frequency. Based on determining which players are on the field and which players are off the field, the groups of players being tracked at the first frequency may be changed and the group of players being tracked at the second frequency may be changed. The processes of steps 332-336 are performed automatically so that Central Computer 20 will automatically choose the first set of players to track at the first frequency and the second players to track at the second frequency. For example, if a player walks off the field, then that player is moved from the group being tracked at the first frequency to the group being tracked at the second frequency. Other events can also be used to trigger the changing of frequencies or the changing of players to be tracked. For example, if the player has the ball, that player may be tracked/identified more frequently. Similarly, certain players who are skilled players may be tracked more frequently. In another embodiment, the system can track players more frequently based on their proximity to the ball. In another embodiment, based on location on the field, different players can be tracked at different frequencies. For example, if a player known to be a quarterback lines up in a different position, that player will then be tracked with greater frequency.

FIG. 11 and FIG. 12 are flowcharts describing two operations performed at RF Controller 24. In one embodiment, these two processes are performed in parallel. In step 360 of FIG. 11, RF Controller 24 will receive instructions from Central Computer 20. In step 362, RF Controller 24 will update its queue based on the instructions received in step 360. As discussed above, in one embodiment the system will track players five times per second if they are on the field and one every two seconds if they are off the field. There are multiple embodiments that can be used.

In one embodiment, Central Computer 20 will create the queue of commands and will send the commands from the queue in sequence to RF Controller 24 in step 360. Each command will identify a player ID. In one example, the commands are sent when Central Computer 20 wants RF Controller to forward them. In another embodiment, the commands are sent with an indication of a time to send them. In another embodiment, the commands (with player IDs) are sent in the sequence desired by Central Computer 20 and RF Controller 24 knows to forward the commands at predefined time intervals. RF Controller 24 receives the commands and populates the data into its own queue in step 362. The queue populated in step 362 is a list of IDs in sequence. Thus, in this embodiment, FIG. 11 is the flow chart describing the population of the queue.

Central Computer 20 will send two hundred commands for each second. The commands indicate the sequence (and implicitly the frequency) of sensing. If a player is to be sensed five times a second, then that player's ID will be sent in five of the two hundred commands for a specific second, and likely to be spaced apart by approximately ⅕ of a second.

In another embodiment, Central Computer will not explicitly command each IR pulse, but will instead command the sequence of transponder ID's to be pulsed. It will then send updates to the sequence as necessary, and may send specific trigger commands, or a completely new sequence.

In another embodiment, Central Computer 20 will send commands to RF Controller 24 indicating the frequency for each player ID. That information will be kept in a data structure on RF Controller 24. That data structure will be used to populate a queue of commands to be sent to the various transmitter boards 82 of pods 30. That queue is kept on RF Controller 24 and populated as part of step 362. When certain events occur during the game, Central Computer may automatically and dynamically update its commands to change the frequency of sensing for some players/objects, add new players/objects to the sensing or remove player/objects from the sensing.

FIG. 12 is a process describing how the queue is used to send out the Data and Pulse to the various transmitter boards 82 of pods 30 from RF Controller 24. In step 380, processor 140 will access the next player ID in the queue. Note that in one embodiment, processor 140 includes its own internal storage, or can use external storage. In step 382, the Data is created, indicating the player ID(s). In step 384, the Data and a synchronized pulse are provided to RS-422 encoder 142, and then transmitted via the Cat5/RS-422 signal to the various pods 30, as described above. After step 384, the process loops back to step 380 and it accesses the next player ID in the queue after waiting an appropriate amount of time based on the desired frequency.

Thus, the queue will indicate a list of player IDs in the order to be transmitted such that IDs for players on the field will be transmitted five times a second and IDs of players off the field will be transmitted once every two seconds. There can be some time slots with no sensing. The order of the players IDs will be arranged such that the polling of each of the players is temporally spaced apart in equal or close to equal periods.

FIG. 13 is a flowchart describing one embodiment of the operation of transmitter board 82. In step 402, transmitter 82 will receive the Pulse and Data from RF Controller 24. In step 404, transmitter 82 will send the trigger signal to each of the cameras 60, 62, 64 and 66 (see FIG. 2). In step 406, transmitter 82 will send the previous player ID to camera computers 70, 72, 74 and 76. That is, the previous player ID sent to the helmets will be sent to the camera computers 70, 72, 74 and 76 in step 406 so that the camera computers know the helmet that transmitted the signal received by cameras 60, 62, 64 and 66 when the trigger signal was asserted. In one embodiment, steps 404 and 406 can be performed simultaneously or in opposite order. In step 408, transmitter 82 will wait for the predetermined time after the pulse. As described above, the transmitters will wirelessly broadcast RF signals indicating which helmet to pulse next and a time to pulse. As indicated by FIG. 7, each of the transmitters send the information at different times. Step 408 includes each transmitter waiting for its appropriately allotted time to transmit (e.g. as per the timing of FIG. 7). In step 410, when it is the appropriate time to transmit, that transmitter 82 will wirelessly broadcast the command to multiple players (or other objects) instructing the particular player/helmet to output at the specified time.

The process of FIG. 13 is performed in response to each set of Data and Pulse received from RF Controller 24; therefore, the process of FIG. 13 is performed (in one embodiment) two hundred times a second. Thus, over a period of one second, the transmitter is sending commands that instruct different subsets of players to output at different times. In the embodiment where one player pulses at a time, the subset includes one player. In alternate embodiments, multiple players can pulse at the same time, and in those cases the subset of players instructed to output would include multiple players. In some embodiments, the system will sometimes pulse only one player, and will other times pulse multiple players.

FIG. 14 is a flowchart describing the operation of the helmet transponder circuit of FIG. 6. In step 440, the system will continuously listen for data. As discussed above, the various transmitters 82 will broadcast data at predetermined times and the helmet transponder circuit will constantly listen for that data in step 440. When data is received in step 442, the helmet transponder circuit determines whether there is an address match. The data broadcast by the transponder 82 includes a player ID. Each helmet has a player ID. If the player ID broadcast matches the player ID stored in the helmet transponder circuit (step 444), then the helmet transponder circuit will count down to the appropriate time in step 446. As discussed above, information transmitted from the transponder indicates a synchronization point and a time from the synchronization point for the helmet to transmit. Step 446 includes counting down until the time for the helmet transponder circuit to transmit. As shown in the bottom line of FIG. 7, it is possible for a helmet to receive information from multiple transmitters. If this happens, the helmet transponder will discard the information received from other transmitters and only act on the data from the last valid transmission received. Therefore, it is possible, in step 446, that a previous countdown will be aborted. In step 448, when it is time for the helmet transponder to transmit its signal, it will pulse its LEDs, as described above. If it was determined, in step 444, that the broadcast player ID does not match the stored player ID, then the helmet will not transmit in this cycle (see step 452).

Figure 15:
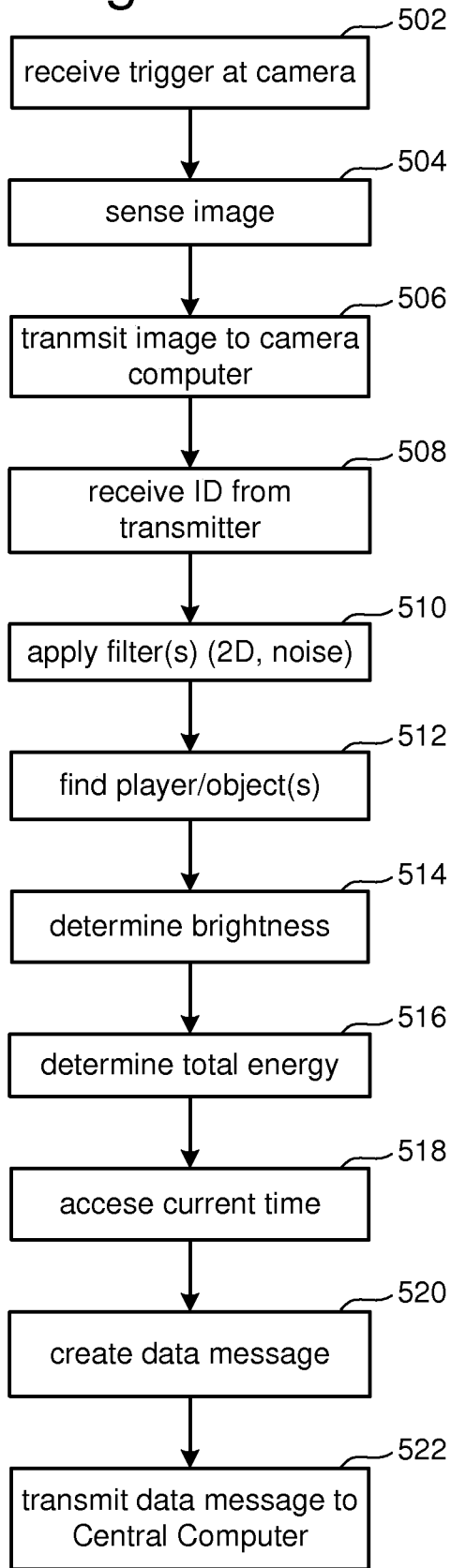
FIG. 15 is a flow chart describing one embodiment of a process for operating the camera.

FIG. 15 is a flowchart describing one embodiment of the operation of cameras 60, 62, 64 and 66 and camera computers 70, 72, 74 and 76. In step 502, the cameras will receive a trigger signal from transmitter 82. In step 504, the cameras will sense an electromagnetic signal from the helmet transponder by capturing an image. The image will likely include one or more clusters of bright pixels. For example, the image will be all black (i.e. pixel values will be below a specified threshold) with one bright cluster of pixels representing the transmitting helmet transponder. That cluster of pixels will likely have multiple pixels (because of the arrangement of LED's on the ball and helmet, it may create two clusters in the image). Some cameras will not detect the transmitting helmet. The image will be transmitted from the camera to the appropriate camera computer in step 506. In step 508, the camera computer will receive the player ID from the transmitter, as discussed above. Note that the order of steps 502-508 can be changed from that depicted in FIG. 15.

In step 510, camera computer will apply one or more filters to the image received from the camera. For example, a noise filter can be used to reduce noise in the image. In one embodiment, the noise filters will be in the form of a threshold. The threshold may be applied before or after frame differencing. Additionally, 2D filters can be used (these describe areas on the CCD that correspond to known or likely false targets). Prior to operation, an operator can obtain images from each of the IR cameras or use mathematics to determine the field of view of the IR camera and determine portions of the field of view of the IR camera that is impossible for a player to be in or areas of the field of view where the system does not want to track players. Using that information, rectangular portions of the image can be identified in the camera's field of view for which data should always be discarded (in other embodiments, these regions need not be rectangular). In step 512 of FIG. 15, the camera computer will find the cluster(s) that most likely correspond to the player or object which transmitted the electromagnetic signal (e.g., IR). For example, the system will find the bright cluster of pixels in the black (typically differenced) image and identify the (perhaps weighted) center pixel of the cluster of pixels. In step 514, the system will determine the peak brightness of the cluster of pixels by identifying the pixel with the greatest brightness value. In step 516, the camera computer will determine the total energy of the cluster of pixels by adding up the brightness values for all the pixels in the cluster of pixels. The system may also compute the average intensity by dividing the total energy by the number of pixels in the cluster. In step 518, camera computer will read the current time. In step 520, the data message will be created that includes the x and y position of the center pixel of the cluster of pixels, the player ID, the time, the brightness of the cluster of pixels, the total energy of the cluster of pixels, and the ID for the camera. In step 522, that data message is transmitted to Central Computer 20 using the Ethernet connection (via hub 80). In one embodiment, the data message does not include a time stamp. Rather, the central computer checks that each camera computer message describes the cluster ID's expected, and nominally expects each message to correspond to the most recent request.

Figure 16:
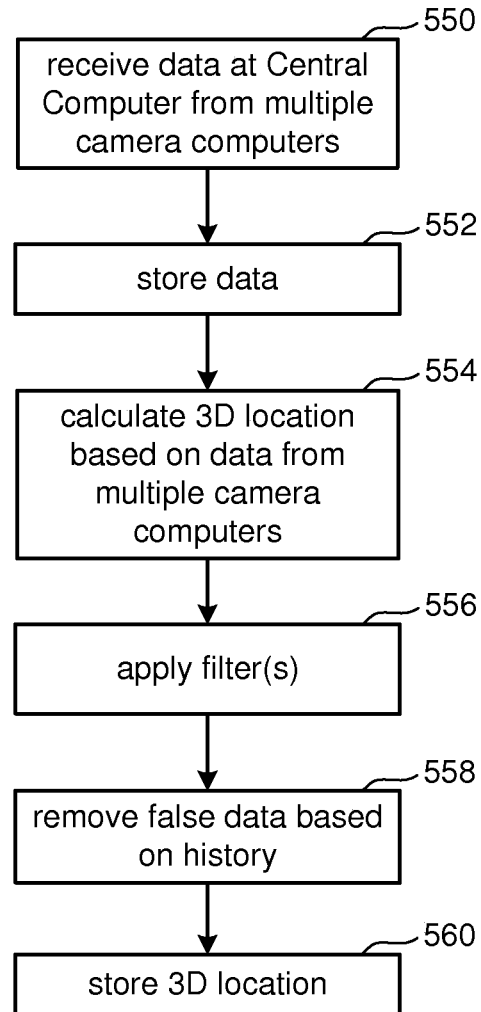
FIG. 16 is a flow chart describing one embodiment of a process for operating the Central Computer to calculate three dimensional locations.

FIG. 16 is a flow chart describing one embodiment of a process for determining the three dimensional location of an object (e.g. player 14). The process of FIG. 16 is performed by Central Computer 20 as part of step 332 of FIG. 10. In step 550 of FIG. 16, data messages for a helmet transponder/player are received at Central Computer 20 from the camera computers 70, 72, 74 and 76 of the various pods 30. These data messages are sent to Central Computer 20 from the camera computers in step 552 of FIG. 15. In step 552, the received data messages are stored in one or more data structures. In step 554, Central Computer 20 calculates a three dimensional location (e.g., x, y, z coordinates) for the moving object (e.g., player 14) based on data messages from multiple cameras. More details of step 554 are provided below.

In step 556, one or more filters are applied to the three dimensional location calculated in step 554. Two examples of filters include region of interest filters and exclusion zones. Region of interest filters are software methods that discard or ignore data that indicate a location outside the region of interest (e.g. players on the sidelines may be outside of the region of play, but inside *a* region of interest). For example, prior to the sporting event, the system can be programmed with the three-dimensional coordinates that describe the football field, hockey rink, basketball court, etc. These are 3D or volumetric filters, and therefore account for Z-coordinate as well. Thus the region of interest may include the volume from field level to 8' above the field matching the lateral extents of the field. For the ball, the region of interest may extend to 50' height or greater to allow for tracking a ball in flight. Additionally, there may be different regions of interest defined either for convenience/simplicity of shape, or to reflect the expected region for a given player at a given time. The sideline region for example may be used to track players on the bench, while the region above the field may be used for active players. Regions of interest may be dynamic as well—perhaps defined by the last known location of a player and the maximum speed he might be expected to move. In one embodiment, the field of play will include the sidelines, teams benches, and anywhere else that the players or ball are allowed to be and it is desired to track. Any data indicating a location of a player outside of these limits will be ignored (or perhaps regarded as less likely to indicate a valid target).

Exclusion zones are known areas of false data. For example, there may be a camera with a light near the field, or any other light near the playing surface. It is common for these lights to emit IR energy. Since the existence and locations of these sources are known, they can be removed from the data considered by the Central Computer when determining the three-dimensional location. One method for ignoring the candidates falling within an exclusion zone is after determining the three-dimensional location of the object, if that location is in an exclusion zone, then ignore that determination of the three-dimensional location. For example, in some instances, the system determines one or more possible locations of the object. If any of these locations are in the exclusion zone, that location is removed from consideration. Alternatively, Central Computer 20 can ignore all lines of position that pass (or substantially pass) through an exclusion zone (see discussion of lines of position, below). This would amount to a 2D exclusion zone. This could be done at the camera computers or at the central computer. The exclusion zone can be manually entered at one of the processors or an operator in the production center can identify the exclusion zone using an input device (e.g. mouse) in connection with a monitor (video or sensor data).

In step 558, Central Computer 20 will remove any calculated three dimensional locations that are not likely to be accurate in light of historical data. For example, the historical data can be used to track a path of movement. If the object suddenly moves too far in too short a time, the later data can be ignored (or weighted less heavily until a consistent pattern emerges). Consider if a player is running on the field from the twenty yard line to the thirty yard line, and then the next calculated three dimensional location a fraction of a second later is in the end zone (e.g., 70 yards away). The newly calculated three dimensional location a fraction of a second later that is in the end zone can be removed from consideration. In step 560, the calculated three-dimensional location (if not removed in steps 556-558) is stored by Control Computer 20.

The process of FIG. 16 is performed for each set of samples of each object being tracked. A set of samples are all of the cluster of pixels simultaneously detected for an object by all of the cameras/sensors detecting that object at that time. Therefore, in one embodiment, the process of FIG. 16 is started two hundred times each second.

FIG. 17 is a flow chart explaining one embodiment for calculating a three dimensional location of an object (e.g., player) based on data from multiple cameras/sensors (step 554 in FIG. 16). In step 680 of FIG. 17, Central Computer 20 determines a line of position (LOP) for cluster of pixels detected by each sensor. Thus, if there are twenty cluster of pixels transmitted to Central Computer 20 for a given helmet transponder, twenty LOPs are determined. The LOP is first calculated in "camera space," the coordinate system in which the IR camera/sensor is at the origin looking along the negative Z axis, with the X axis extending to the right and the Y axis extending upward. The 3 dimensional LOP vector is then transformed into the coordinate system of the stadium.

In order to calculate the LOP in camera space, the sensor focal length, aspect ratio, and optical distortion are measured. This measurement indicates that a target a meter away if moved one pixel to the side moves h meters in space, and if moved one scan line up or down, moves v meters in space. From these ratios, given that the cluster is x pixels and y scan lines from the center of the sensor field of view, a vector is constructed:

$$V=(x*h, y*v, 1.0)$$

A line of position is represented as a point (P) and the vector (V):

$$LOP=P,V$$

The LOP is a parametric representation of a line, since any point on the line can be represented as:

$$p=P+k*V,$$

where k is a scalar.

An LOP is transformed into the three dimensional coordinate system of the arena by a 4.times.4 matrix (or by using a 3.times.3 rotation matrix and a known translation). The three element vector is multiplied by the inverse of the upper left 3.times.3 matrix of the 4.times.4 transformation matrix. The four element point is multiplied by the inverse of the 4.times.4 transformation matrix.

For a rigidly mounted IR camera/sensor, an example transformation matrix (J)

$$J=TYPR$$

where, $T$=[1 0 0 0 0 1 0 0 0 0 1 0–$x$–$y$–$z$1] ##EQU0001
 ##$Y$=[cos yaw–sin yaw 0 0 sin yaw cos yaw 0
 0 0 0 1 0 0 0 0 1] ##EQU0001.2 ##$P$=[1 0 0 0
 0 cos pitch–sin pitch 0 0 sin pitch cos pitch 0 0
 0 0 1] ##EQU0001.3 ##$R$=[cos roll 0 sin roll 0
 0 1 0 0–sin roll 0 cos roll 0 0 0 0 1]
 ##EQU00001.4 ##

Since the IR sensor is in a fixed position, the yaw, pitch and roll can be measured, estimated or derived during the registration process, described below.

After lines of position are determined for every cluster of pixels, Central Computer 20 groups all possible pairs of LOPs (step 682). For each pair of LOPs, Central Computer 20 finds the closest point of approach of the two LOPs (step 684). If the LOPs do not intersect the closest point of approach will be two points, one on each LOP. The line connecting the two points is perpendicular to both LOPs. To simplify the calculations, one embodiment contemplates using the midpoint of the line perpendicular to both LOPs as the closest point of intersection. However, both points can be used in the steps described below.

At the end of step 684, Central Computer 20 now has a set of points of closest approach. This set of points may fall into one or more groups—or 3D clusters. There will be a threshold for closest approach of two LOP's, and a threshold for distance between points that can be considered in the same 3D cluster. In step 686, Central Computer 20 groups the candidates into one or more 3D clusters, and then finds the weighted centroid for each such cluster. The center may be the average of the coordinates of the points of closest approach, or may be weighted based on proximity to most recently tracked position for this target, distance of closest approach of the LOP's from which it came, etc. In step 688, Central Computer calculates a sphere around the center point. The radius of the sphere is predefined. The radius should be big enough to allow the system to function, but small enough so that improper data is thrown out. In one embodiment, the radius is set as one meter; however, other values can be used. Each time the system is set up, a user may need to use trial and error to determine the proper radius. In step 690, Central Computer 20 determines whether all the points fit within the sphere. If not, Central Computer 20, in step 692, removes the furthest point and loops back to step 686. If all the points do fit within the sphere, then the average or center of the sphere is a candidate for the three-dimensional location of the object.

One alternative is to reduce the radius for each iteration, continue iterating until the minimum radius is reached (e.g. 0.1 meter) and if there are a predefined number of points remaining (e.g. 0.2) then a valid three dimensional location candidate has been found. Another alternative includes reducing the radius for each iteration, removing all points outside the sphere for each iteration, continue iterating until the minimum radius is reached (e.g. 0.1 meter) and if there are a predefined number of points remaining (e.g. >2) then valid three dimensional location candidate has been found. The points of closest approach may form more than one separate group of points, in which case the method of FIG. 17 can be repeated for each group of points and more than one location candidate will be determined. The incorrect candidates should be removed when applying filters in step 556 of FIG. 16.

FIG. 18 is a flow chart describing another method for determining a three dimensional location of an object (step 554 of FIG. 16) that is based on the probabilities of finding the object at certain locations along or near the lines of position. In step 696, lines of position are determined for each cluster of pixels of each camera/sensor for the particular object under consideration. In step 698, the system determines cones for each line of position. That is, each line of position can be thought of as a set of cones, one inside the other. Each cone represents a space with an assigned probability for the object within that space. In step 700, a set of cubes are figuratively created. A first layer of cubes lie on the playing surface. A second layer of cubes are located above the first layer, and so on. Each cone is projected such that it passes through one or more cubes. For each line of position, the probability for a given cube is proportional to the cube's distance from the cone's axis. If more than one cone for a particular line of position passes through a cube, the cube is assigned the probability of the highest probability cone passing through it. If a cube lies within cones from more than one line of position, a cube will be assigned more than one probability. Each of the probabilities assigned to each cube are added (or multiplied, etc.) and the result is stored for each cube (step 702). If a cube was assigned only one probability, then that one probability is the stored result. The cube with the highest probability is assumed to be the cube where the object is (step 704). In one embodiment, the cubes are small enough so that the resolution of the cube is sufficient to find the object in one iteration. In one alternative, the playing surface is divided into a small set of larger cubes and step 704 determines which of the large cubes the object lies in. Since the resolution of the cubes is not fine enough for the object location determination to be accurate, the process is repeated (in step 706) by looping back to step 700, dividing the one cube which contains the object into smaller cubes, the probability is added up for each of the smaller cubes and the system determines which of the smaller cubes contains the object. If the resolution of the small cube is sufficient, the method ends; otherwise, the method performs another iteration. The inventors contemplate numerous other similar implementations that make use of the probability of the objects location that are suitable for use with the technology described herein.

In one alternative, the system can identify two or more players in a single frame if those players are not likely to be confused from one another (e.g. players on opposite team benches, different sides of the field, etc.). Central Computer 20 would determine that two or more players are located apart from each other by more than a threshold based on past and current location data, and send commands (via the RF Controller) to the two or more helmets to output at the same time in response to determining that two or more players are located apart from each other by more than the threshold. The cameras would simultaneously sense the IR pulses from the multiple helmets and the camera computers would find cluster of pixels for the multiple helmets in the captured image. The camera computers would send data packets for the multiple helmets to Central Computer 20. Based on previous locations of the two or more helmets, Camera Computer 20 will distinguish the cluster of pixels of the two or more helmets in the captured image and determine new locations for the two or more helmets based on the received IR pulses.

In one embodiment, the referees' hats can be instrumented with effectively the same electronics that are in the helmet so that the referrers can be tracked in the same manner as the players.

IV. Registration

Registration is the process of defining how to interpret data from a sensor (a camera being one type of sensor). The sensors described above output data, for example, related to position. Since position is relative, the system needs a reference from which to determine a location. Thus, in order to be able to use positional data, the system needs to know how to interpret the positional data to make use of the information. One example of how to interpret data from different sensors is to use the matrices described above. In that embodiment, defining how to interpret data includes determining suitable values for the variables in the matrices.

Figure 19:
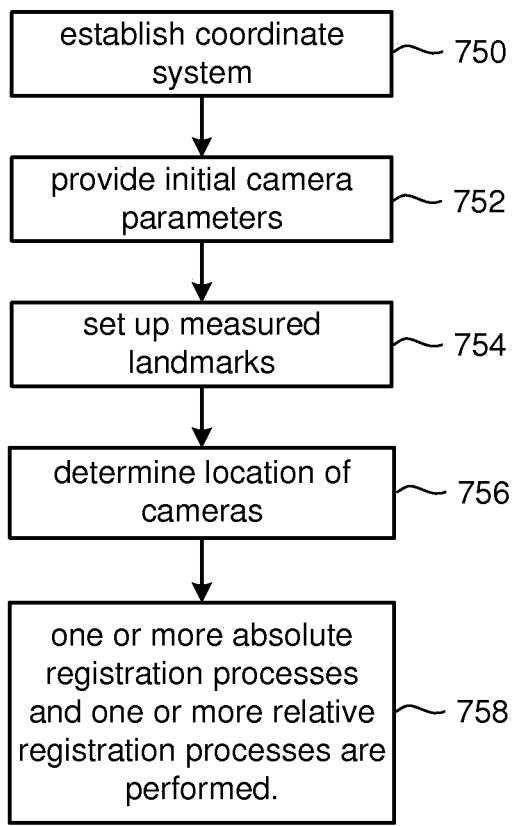
FIG. 19 is a flow chart describing one embodiment of a process for initializing a tracking system.

FIG. 19 is a flow chart for registering the tracking system disclosed above. In step 750, a coordinate system is established, which is accomplished by establishing x, y, z axes with an origin (0,0,0). In one embodiment, the origin is located at the corner of the football field; however other locations for the origin can also be used. For example, in a hockey rink, the origin could be at the center of the ice. In a basketball court, the origin could be at the center of the court or a corner of the court. Other locations for the origin can also be used. In step 752, an initial educated guess is made at the parameter values for the transformation matrix (J) based on experimentation and past use. The guessed parameters will be improved upon later, so they need not be perfect at this time. In step 754, a set of landmarks are established. A landmark is a known location in the coordinate system established in step 750 for which there is an IR emitting device (by increasing the shutter time the system can register to passive markings that would not be typically considered IR emitters—like the white lines on the field. Alternatively, the system can remove the IR filter during the registration process). The locations of the landmarks can be known due to measuring them or due to placing them in known locations on the field (e.g., on a marked yard line). In one embodiment, the pylons at the four corners of both end zones can be used as landmarks by placing IR emitters on them or by increasing the shutter time to see the pylons without active IR emitters. These landmarks will be used with the process of FIG. 20.

In step 756, the three dimensional locations of the IR cameras/sensors are determined. In one embodiment, they are measured. In step 758, one or more absolute registration processes (FIG. 20) and (optionally) one or more relative registration processes (FIG. 21) are performed. In some embodiments, the three dimensional locations of the IR cameras/sensors are guessed at in step 752 and refined in step 758.

As described above, the system will use of a set of landmarks at known locations. Many different landmarks could be used. In one example, in an American football game, the end zone on each side of the field has four bright orange pylons. The location of these pylons can be measured as part of step 754 of FIG. 19. Alternatively, other landmarks can be used as long as the location is known. In one embodiment, IR emitting devices are placed on the pylons. In an alternative embodiment, for example a hockey game, IR emitting devices can be placed in known locations on the ice before the game and around the ice during the game. Other alternatives can be used for different events.

Figure 20:
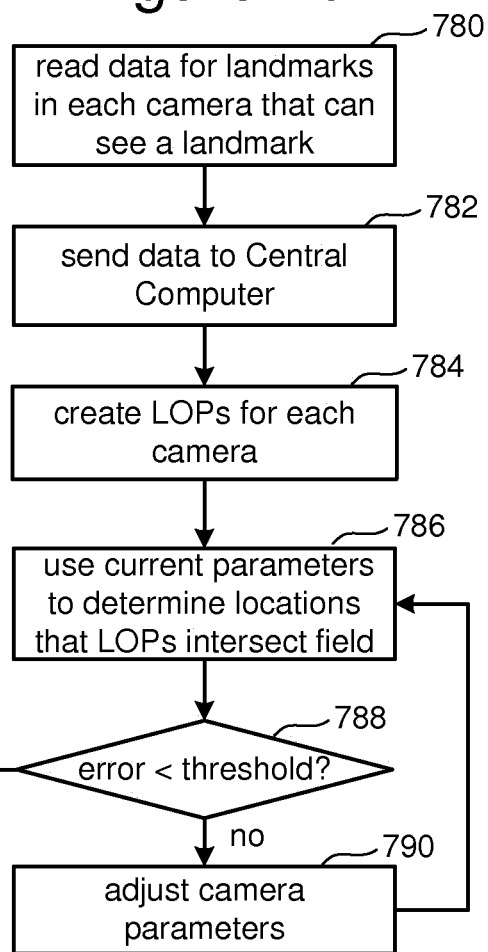
FIG. 20 is a flow chart describing one embodiment of a process for performing an registration.

FIG. 20 is a flowchart describing one embodiment of an absolute registration processes using landmarks. In step 780, each of the cameras will capture an image which includes one or more landmarks. In one embodiment, step 780 includes performing the process of FIG. 15. In step 782, the data message (see step 522 of FIG. 15) is sent to the camera computer. Steps 780 and 782 can be performed for all or a subset of cameras. In one embodiment, steps 780 and 782 are concurrently performed for all cameras that can see any of the landmarks. In step 784, Central Computer 20 will create a line of position for each landmark seen by each camera using any of the processes described above. In step 786, the system will use the current set of camera parameters to determine the locations that the LOPs intersect the field. Those locations will be considered initial locations of the landmarks. In step 788, the initial location of the landmarks determined in step 786 are compared to the known locations for the landmarks. Note that step 786 and 788 are performed for all landmarks seen by all the cameras that have seen landmarks.

If the error between the known location of the landmarks and the newly determined location is less than the threshold, then the parameters used in the previous iteration of step 786 are saved as the camera parameters. If the error is not less than a threshold, then the camera parameters (e.g., variables in the matrices above) are adjusted and the process loops back to step 786. In one embodiment, the error compared in step 788 is the sum of all the errors (absolute value or squared) for all the landmarks. In another embodiment, the error compared in step 788 is the sum of all the errors for all the lines of position. In one embodiment, the error compared in step 788 is the square root of the sum of the squares of the errors. Other calculations for aggregating error can also be utilized. The loop of step 786, 788 and 790 will be continuously performed until the camera parameters are adjusted to reduce the error to below the threshold (or until no further significant improvement is achieved).

In some embodiments, every camera will be able to see at least one landmark. Therefore, the registration process will include performing the processes of FIGS. 19 and 20. In another embodiment, there will be some sensors that will not see any landmarks. In that embodiment, some of the sensors will be registered using the process of FIG. 20, referred to as absolute registration, while other sensors will be performed using a relative registration process. In the relative registration process, a sensor is registered based on data from another sensor (effectively using dynamic targets as landmarks).

Figure 21:
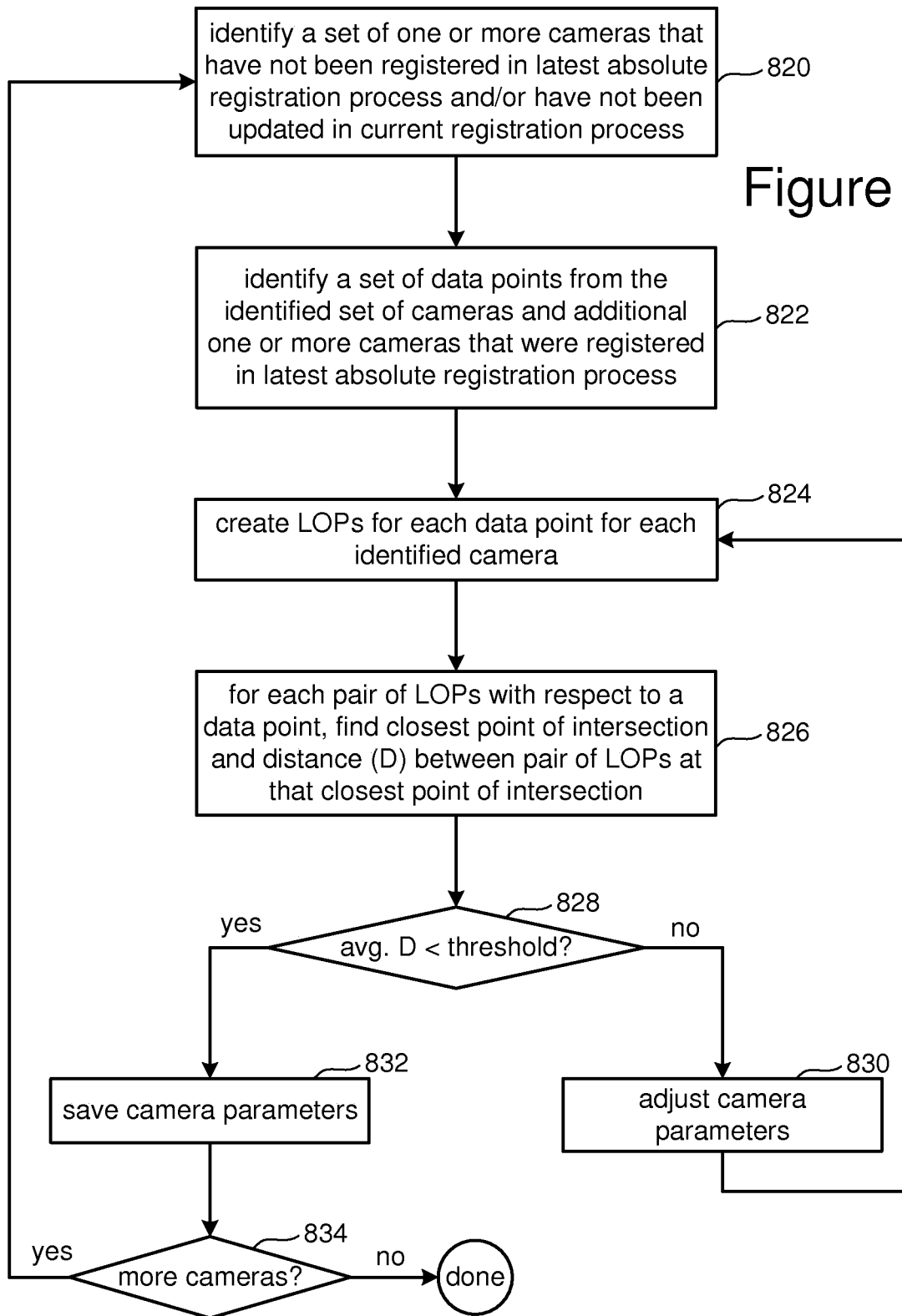
FIG. 21 is a flow chart describing one embodiment of a process for performing registration relative to other sensors.

FIG. 21 is a flowchart describing one embodiment of a relative registration process. In one example, some of the sensors are first registered using the process of FIG. 20. Subsequently, other sensors are registered using the process of FIG. 21. During the event, the processes of FIGS. 20 and 21 can be repeated in any order throughout the event. In step 820 of FIG. 21, the system will identify a set of one or more cameras/sensors that have not been registered in the latest absolute registration process and/or have not been updated in the current registration process of FIG. 21. That is, the system is identifying which sensors need to be registered in the current performance of the process of FIG. 21. In step 822, the system will identify a set of data points (e.g., data packets about cluster of pixels in camera images) from the identified set of cameras from step 820 and one or more cameras that were registered already in the latest absolute registration process. That is data about the sensing of the same IR source is obtained from the identified set of cameras from step 820 and one or more cameras that were registered already in the latest absolute registration process.

The process of FIG. 21 is based on comparing target position(s) seen from each camera for a number of frames. Because the system takes nearly two hundred frames per second and the system is seeing more than twenty players on the field and twice as many on the sideline, the system will acquire a rich data set from which to compare camera registrations. This will be used to ensure consistency between registrations. In other words, lines of position should pass through the smallest possible volume of the target. Thus, in step 822, the system will identify data points (sensing of the same helmet) for multiple sensors where some of the sensors have been absolutely registered and some of them have not been registered properly yet or need to be updated (of course it's possible also to register a camera against another camera that itself was registered in only a relative sense—so long as there is an absolute registration somewhere in the process). In step 824, lines of position will be created for each of those data points for each identified camera. For each pair of lines of position with respect to a data point, the system will find the closest point of approach and distance D between the pair of lines of position at that closest point of approach. In step 828, the system will determine whether the average distance D is less than the threshold. If not, then the current camera parameters are adjusted for the camera being relatively registered and the process moves back to step 824. If the average distance is less than the threshold, then the camera parameters are saved in step 832. In step 834, the system determines whether there are any more cameras that need to be relatively registered using the process of FIG. 21. If not, the process of FIG. 21 is complete. If so, the process loops back to step 820 and chooses the next set of cameras to relatively register. Even if each camera registration is better than the minimum threshold, the system may attempt further refinement to continue to improve its registration on a somewhat regular basis.

V. Ball Tracking

In addition to tracking players (moving or not), the system can simultaneously track a moving ball. In one embodiment, the system will manually track the ball. For example, a user using UI Computer 22 will use a mouse (or other pointing device) to click on (or otherwise select) the player who is holding the ball. In one embodiment, the user interface for the UI Computer 22 will include a list of players. The user of UI Computer 22 will simply click on the name of the player who currently holds the ball. Since the system knows the location of the player (or the player's equipment), the system can know the approximate location of the ball every time the player (or the player's equipment) is automatically identified. (and the system may interpolate ball location when the user indicates possession changes. Such interpolation could take advantage of physical modeling of gravity, wind resistance, etc.).

FIG. 22 is a flowchart describing an embodiment for manually tracking the ball. In step 860, Central Computer 20 receives an indication of the possession of an object. For example, the user clicks on the name of a player using UI Computer 22, and UI Computer 22 will transmit that indication to Central Computer 20 that the selected player possesses the ball at the specified moment in time. This can be converted into a 3D location for the ball by doing a lookup of the associated player coordinates. Additionally, other objects besides the ball can be tracked. In step 862, Central Computer 20 will look up the location of the player (or the player's equipment) who is in possession of the object/ball. In step 864, the location of the player is stored as the location of the object/ball for the current time. The system will maintain a database that includes a set of locations of the object/ball and the corresponding time for each location data point. In step 866, it is determined whether possession of the object/ball has changed. That is, the system will determine whether the object was associated with a different player in the previous iteration. If the previous location data was associated with another player, then the possession of the object/ball has changed. If the previous location data was with the same player as the current location data, then possession has not changed. If possession has not changed, then the process of FIG. 22 is completed. If possession has changed, then Central Computer 20 will access the previous location for the object/ball. In step 872, Central Computer 20 will interpolate intermediate location between the current location of the object/ball and the previous location of the object/ball using any interpolation method known in the art (including physical modeling if appropriate) In step 872, the intermediate locations that were the result of step 870 are stored in the database. The stored location information for the object/ball can be reported in the same manner as described above for the players. In one embodiment, the process of FIG. 22 can be repeated continuously.

In another embodiment, the object/ball is tracked automatically. FIGS. 8A and 8B, discussed above, provide hardware for automatically tracking the ball. FIG. 23 is a flowchart describing one embodiment which can be used with the hardware of FIGS. 8A and 8B in order to automatically track the ball or other moving object. In step 900, the sensor (e.g. RFID tag reader 202) will automatically detect the presence of an RFID tag 208. That is, the RFID tag reader automatically senses that the ball is in proximity to the player (in possession of the player or near the player). Controller 200 of FIG. 8A will create a data packet with the player ID, RFID tag ID and current time. In some embodiments, the data packet will not include time or the RFID tag number, particularly if the ball is the only thing being tracked by RFID. In step 904, the controller will broadcast the data packet via radio module 204 so that one or more listening stations (FIG. 8B) will receive the broadcast. Such listening stations may be included in the instrumentation carried by the player. In such cases, the data would either be recorded locally, or re-transmitted to stations around the field. It's possible to send the "possession" message via coded blinks of the IR emitters as well as RF. In step 906, at least one RFID listening station detects the broadcast and receives the data packet. In step 908, the one or more listening stations that received the data packet send the data packet to Central Computer 20 via Ethernet or other communication means. In step 910, Central Computer 20 processes the data packet using the method of FIG. 22. Central Computer 20 will be receiving multiple indications from different players during the event that the players are in possession of the ball. Simultaneously (or before or afterwards), Central Computer 20 will also be automatically determining locations of multiple players (who are likely to be moving). Using the method of FIG. 22, Central Computer 20 will store the location of a first player as the location of the ball in response to receiving an indication from the first player that the first player is in possession or proximity to the ball, and then store the location of a second player as the location of the ball in response to receiving an indication from the second player that the second player is in possession or proximity to the ball. Intermediate locations will be interpolated, as described by the process of FIG. 22. When two or more players indicate possession during the same frame, the system will likely use signal strength or last possession to determine current possession. Alternatively, the system might compute the weighted centroid based on signal strength from each such player. In some embodiments, the process of FIG. 23 is repeated continuously.

In an alternative embodiment, the ball can be instrumented with electronics that are effectively the same as those in the helmet so that the ball can be tracked in the same manner as a helmet.

VI. Concussion Sensing

Figure 24:
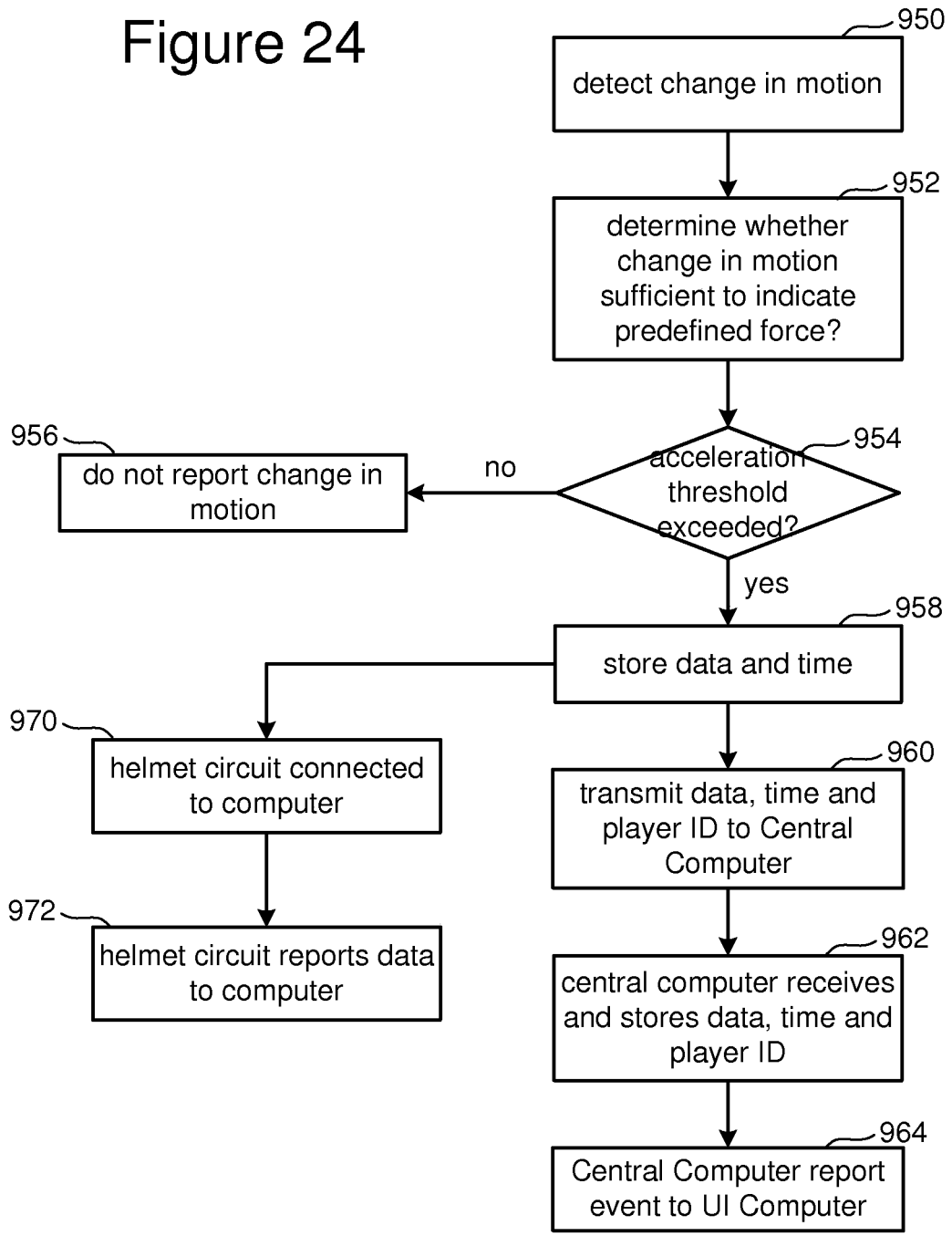
FIG. 24 is a flow chart describing one embodiment of a process for automatically detecting and reporting a concussion or other condition.

FIG. 6 depicts a helmet transponder circuit that includes a set of accelerometers 194 connected to (or are in communication with) processor 184. FIG. 24 is a flowchart describing one embodiment of a method for automatically detecting a concussion risk for a player wearing the helmet that includes the circuit of FIG. 6. In step 950, processor 184 will detect a change in motion based on data from the accelerometers. In step 952, processor 184 will determine whether the change in motion is sufficient to indicate a predefined force or acceleration. Based on experimentation in a laboratory, it can be determined how much force or acceleration is necessary to indicate a concussion risk in an average person (or an average athlete). If the amount of force detected in step 950 does not meet that predefined amount of force (step 954), then processor 184 will not report a concussion risk or otherwise any change in the motion (step 956). Additionally, the system can maintain a history of impacts that might cumulatively indicate risk of brain damage. If the amount of force did meet the predefined amount of force for a concussion (step 954), then the processor 184 will store the motion data and the time it was recorded in step 958. There are two embodiments disclosed in FIG. 24 for reporting the concussion data. In one embodiment, when the player comes to a sideline (or any time or place after the event), the helmet can be plugged into a computer via USB port connected to processor 184 in order to download the data. For example, in step 970, the helmet circuit is connected to a computer via USB port. In step 972, processor 184 will report the motion data to the computer. It would also be possible to query the helmet on the sideline via RF, IR, or other means. It's not necessary that it be plugged into the computer directly.

In another embodiment, processor 184 can use radio module 182 to automatically broadcast the data to a listening station (e.g. listening station of FIG. 8B or another device) during the event (or afterwards). Steps 960-964 of FIG. 24 include wirelessly reporting the information. For example, in step 960, the data, time and player ID is wirelessly transmitted to camera computer by first transmitting it wirelessly to a listening station and then from the listening station to the Central Computer 20 via Ethernet or other transport means. In step 962, Central Computer 20 receives and stores the data, time and player ID. In step 964, Central Computer 20 reports the concussion information to UI Computer 22. At that point, the operator of the UI Computer 22 can inform a coach or medical personnel using the user interface, sending a text message or email to the coach or medical personnel.

One embodiment includes wirelessly sending commands to the multiple objects instructing different subsets of the multiple objects to report at different times, outputting electromagnetic signals from the multiple movable objects in response to respective commands, sensing the electromagnetic signals from multiple movable objects, and calculating locations of the multiple objects based on the sensed electromagnetic signals from the multiple movable objects.

In one example implementation, the commands change dynamically during the event based on or more occurrence in the event. In another example implementation, the commands change dynamically during the event by adding or removing one or more objects from the commands associated with a particular iteration.

In one embodiment, the system automatically chooses a first subset of the objects to track at a first frequency and automatically choosing a second subset of the objects to track at a second frequency. The outputting and sensing are performed for the first subset of the objects at the first frequency while the outputting, sensing and calculating are performed for the second subset of the objects at the second frequency in response to the automatically choosing the first subset and the automatically choosing the second subset. Of course the system might identify and track any number of objects at any number of frequencies. For example, the system might track active players 5 times/second, benched players once every 2 seconds, the ball 3 times/second, refs once/second, and fixed registration targets once every 10 seconds.

In one embodiment, the wirelessly sending commands to the multiple objects comprises determining that two or more objects of the multiple objects are located apart from each other by more than a threshold and sending commands to the two or more objects to output at the same time in response to determining that two or more objects are located apart from each other by more than the threshold, the sensing the electromagnetic signals from multiple movable objects comprises capturing an image and finding indications of the two or more objects in the captured image, and the calculating locations of the multiple objects includes distinguishing the indications of the two or more objects in the captured image based on previous locations of the two or more objects and determining new locations for the two or more objects based on the indications of the two or more objects in the captured image. Alternatively, the system may at times track two or more objects that may not be separated by a minimum threshold, but where uniquely identifying the objects is not important. One such example might include tracking the referees.

One embodiment includes multiple objects each of which includes a wireless receiver and a transmitter for providing an output, one or more wireless transmitters that send commands to the wireless receivers for the multiple objects instructing different subsets of the multiple objects to report at different times, object sensors that receive output from the multiple objects, and a computer system in communication with the object sensors, the computer system calculates locations of the multiple objects based on the sensed output from the multiple objects.

One embodiment includes wirelessly acquiring position samples of multiple objects that can move concurrently, calculating locations of the objects based on the position samples, wirelessly sending instructions to the objects that change timing of the position samples, wirelessly acquiring additional position samples of the set of objects based on the changed timing, and calculating new locations of the objects based on the additional position samples.

One embodiment includes wirelessly sending commands to the multiple objects instructing different subsets of the multiple objects to output at different times, sensing output from the multiple movable objects based on the commands and calculating locations of the multiple objects based on the sensed output from the multiple movable objects.

One embodiment includes automatically determining locations of multiple moving objects, automatically sensing that a first object of the multiple moving objects is in proximity of an item, identifying and storing a location of the first object as a first location of the entity, automatically sensing that a second object of the multiple moving objects is in proximity of the item, and identifying and storing a location of the second object as a second location of the item.

One embodiment includes multiple objects each of which includes one or more local sensors and a transmitter. The sensors detect presence of an item. The transmitters communicate presence of the item based on respective one or more local sensors. The system further includes one or more object sensors that sense position information about the multiple objects, one or more receivers that receive one or more communications from one or more of the objects indicating presence of the item, and a computer system in communication with the one or more receivers and the one or more object sensors. The computer system calculates locations of the multiple objects based on the sensed position information. The computer system identifies a location of the item based on communications from one or more of the objects indicating presence of the item and the calculated locations of the multiple objects.

One embodiment includes means for automatically determining locations of multiple moving objects, means for automatically sensing that a first object of the multiple moving objects is in proximity of an item and subsequently automatically sensing that a second object of the multiple moving objects is in proximity of the item, and means for identifying and storing a location of the first object as a first location of the entity in response to sensing that the first object of the multiple moving objects is in proximity of the item, and for identifying and storing a location of the second object as a second location of the item in response to sensing that the second object of the multiple moving objects is in proximity of the item.

One embodiment includes registering a first set of sensors using a set of landmarks detectable by the first set of sensors and registering a second set of sensors based on the first set of sensors.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method for tracking objects at a live sporting event comprising:
    a computer including a processor and a memory receiving signal data measured by at least one sensor, wherein the signal data is associated with a multiplicity of objects;
    wherein the multiplicity of objects comprises at least one first object and at least one second object;
    wherein the at least one first object is configured with at least one tag;
    wherein the at least one second object is configured with at least one tag reading circuit and at least one transponder;
    determining locations of the multiplicity of objects based on the signal data;
    determining a first frequency for tracking the at least one second object based on a first location of the at least one second object;
    determining a second frequency for tracking the at least one second object based on a second location of the at least one second object;
    tracking the at least one second object with the first frequency based on the first location of the at least one second object; and
    tracking the at least one second object with the second frequency based on the second location of the at least one second object.

2. The method of claim 1, wherein determining the locations of the multiplicity of objects based on the signal data includes determining three-dimensional locations of the multiplicity of objects.

3. The method of claim 2, wherein the three-dimensional locations of the multiplicity of objects are contained in a volume defined at least in part by a height measured from a venue field to a height of up to fifty feet above the venue field.

4. The method of claim 1, further comprising the computer instructing the at least one sensor to change a frequency at which the at least one second object is tracked based on the location of the at least one second object, and wherein the at least one second object is a player.

5. The method of claim 1, wherein the first location is on the field, wherein the second location is off the field, and wherein the computer is operable to instruct the at least one sensor to change frequencies based on the location of the at least one second object, and wherein the at least one second object is a player.

6. The method of claim 1, wherein the at least one tag reading circuit detects whether the at least one tag is in proximity to the at least one tag reading circuit, and further comprising the computer instructing the at least one sensor to change a frequency at which the at least one second object is tracked based on the at least one tag reading circuit attached to the at least one second object detecting at least one tag in proximity to the at least one tag reading circuit.

7. The method of claim 1, wherein the at least one second object is a player, and wherein the at least one tag reading circuit is configured to send information to the computer regarding possession of the at least one first object by the at least one second object.

8. The method of claim 1, further comprising receiving acceleration data measured by accelerometers associated with the multiplicity of objects.

9. The method of claim 8, wherein the at least one second object is a player, and wherein the computer indicates a risk of concussion if the acceleration data associated with the at least one second object exceeds a predefined value.

10. The method of claim 1, wherein the at least one sensor comprises at least one infrared (IR) camera, wherein the at least one transponder comprises at least one IR transponder, and wherein the computer is operable to instruct the at least one IR transponder and the at least one IR camera when to pulse.

11. A system for tracking objects at a live sporting event comprising:
    a computer including a processor and a memory operable to receive signal data measured by at least one sensor at a live sporting event, wherein the signal data is associated with a multiplicity of objects at the live sporting event;
    wherein the multiplicity of objects comprises at least one first object and at least one second object;
    wherein the at least one first object is configured with at least one tag;
    wherein the at least one second object is configured with at least one transponder and at least one tag reading circuit;
    wherein the computer is operable to determine locations of the multiplicity of objects based on the signal data;
    wherein the computer is further operable to determine a first frequency for tracking the at least one second object based on a first location of the at least one second object; and
    wherein the computer is further operable to determine a second frequency for tracking the at least one second object based on a second location of the at least one second object.

12. The system of claim 11, wherein the computer is operable to determine three-dimensional locations of the multiplicity of objects.

13. The system of claim 12, wherein the computer is operable to determine the three-dimensional locations of the multiplicity of objects in a volume defined at least in part by a height measured from a venue field of the live sporting event to a height of up to fifty feet above the venue field of the live sporting event.

14. The system of claim 11, wherein the computer is operable to instruct the at least one sensor to change a frequency at which the at least one second object is tracked based on the location of the at least one second object, and wherein the at least one second object is a player.

15. The system of claim 11, wherein the first location is on the field, wherein the second location is off the field, and wherein the computer is operable to instruct the at least one sensor to change frequencies based on the location of the at least one second object, and wherein the at least one second object is a player.

16. The system of claim 11, wherein the at least one tag reading circuit detects whether the at least one tag is in proximity to the at least one tag reading circuit, and wherein the computer is operable to instruct the at least one sensor to change a frequency at which the at least one second object is tracked based on the at least one tag reading circuit attached to the at least one second object detecting at least one tag in proximity to the at least one tag reading circuit.

17. The system of claim 11, wherein the at least one second object is a player, and wherein the at least one tag reading circuit is configured to send information to the computer regarding possession of the at least one first object by the at least one second object.

18. The system of claim 11, wherein the computer is further operable to receive acceleration data measured by accelerometers associated with the multiplicity of objects.

19. The system of claim 18, wherein the at least one second object is a player, and wherein the computer indicates a risk of concussion if the acceleration data associated with the at least one second object exceeds a predefined value.

20. The system of claim 11, wherein the at least one sensor comprises at least one infrared (IR) camera, wherein the at least one transponder comprises at least one IR transponder, and wherein the computer is operable to instruct the at least one IR transponder and the at least one IR camera when to pulse.

\* \* \* \* \*